(12) United States Patent
Tomita

(10) Patent No.: US 10,711,436 B2
(45) Date of Patent: Jul. 14, 2020

(54) WORK MACHINE OPERATION ASSISTANCE DEVICE

(71) Applicant: HITACHI CONSTRUCTION MACHINERY CO., LTD., Tokyo (JP)

(72) Inventor: Kunitsugu Tomita, Kashiwa (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 139 days.

(21) Appl. No.: 15/779,099

(22) PCT Filed: Nov. 9, 2016

(86) PCT No.: PCT/JP2016/083285
§ 371 (c)(1),
(2) Date: May 25, 2018

(87) PCT Pub. No.: WO2017/094463
PCT Pub. Date: Jun. 8, 2017

(65) Prior Publication Data
US 2018/0347149 A1    Dec. 6, 2018

(30) Foreign Application Priority Data
Nov. 30, 2015 (JP) .................... 2015-233739

(51) Int. Cl.
*E02F 9/20* (2006.01)
*F15B 21/02* (2006.01)
(Continued)

(52) U.S. Cl.
CPC .............. *E02F 9/2012* (2013.01); *E02F 9/20* (2013.01); *E02F 9/2025* (2013.01); *F15B 11/04* (2013.01);
(Continued)

(58) Field of Classification Search
CPC ......... E02F 9/2012; E02F 9/20; E02F 9/2025; E02F 3/43; E02F 3/964; F15B 11/04;
(Continued)

(56) References Cited

U.S. PATENT DOCUMENTS

2004/0145241 A1 * 7/2004 Arakawa ............... B60R 25/102
307/10.3
2004/0148083 A1 * 7/2004 Arakawa ............... G07C 5/008
701/50

(Continued)

FOREIGN PATENT DOCUMENTS

JP    62-244931 A    10/1987
JP    09-069002 A    3/1997
(Continued)

OTHER PUBLICATIONS

Gu Design of robotic excavator arm control utilizing proportional-integral-plus, 2008, IEEE, p. 971-976 (Year: 2008).*
(Continued)

Primary Examiner — McDieunel Marc
(74) Attorney, Agent, or Firm — Mattingly & Malur, PC

(57) ABSTRACT

A work machine operation assistance device enables setting of a manipulation gain appropriate for a skill level and habits of an operator and/or actual work contents. The work machine operation assistance device includes: a manipulation gain storage section storing a manipulation gain; a manipulated variable detection section detecting a manipulated variable of the operating device; a time integration section adding up time that the operating device is operated; a manipulated-variable frequency arithmetic section computing a manipulated-variable frequency of the operating device; a manipulated-variable frequency criterion setting section presetting a criterion value for the manipulated-variable frequency; a manipulation gain update arithmetic section performing a computation to update the manipula- (Continued)

tion gain; a manipulation gain display section displaying a result of the manipulation gain computed; and a manipulation gain update selection section to select whether or not an update to the manipulation gain displayed on the manipulation gain display section is performed.

12 Claims, 20 Drawing Sheets

(51) Int. Cl.
    *G05B 13/02*     (2006.01)
    *F15B 11/04*     (2006.01)
    *F15B 11/16*     (2006.01)

(52) U.S. Cl.
    CPC .............. *F15B 21/02* (2013.01); *G05B 13/02* (2013.01); *F15B 11/16* (2013.01); *F15B 2211/6346* (2013.01); *F15B 2211/7053* (2013.01); *F15B 2211/7058* (2013.01); *F15B 2211/7135* (2013.01); *F15B 2211/75* (2013.01); *F15B 2211/78* (2013.01); *G05B 2219/25312* (2013.01)

(58) Field of Classification Search
    CPC ... F15B 21/02; F15B 11/16; F15B 2111/6346; F15B 2211/7053; F15B 2211/7058; F15B 2211/7135; F15B 2211/75; F15B 2211/78; G05B 13/02; G05B 2219/25312; B60K 6/48; B60L 1/00; B66F 17/006; B25D 17/24

See application file for complete search history.

(56) References Cited

U.S. PATENT DOCUMENTS

| | | | | |
|---|---|---|---|---|
| 2004/0198254 | A1* | 10/2004 | Mizui | G08G 1/20 |
| | | | | 455/99 |
| 2015/0032338 | A1* | 1/2015 | Tomita | E02F 3/964 |
| | | | | 701/50 |
| 2016/0215479 | A1* | 7/2016 | Ishihara | B60K 6/48 |
| 2018/0057320 | A1* | 3/2018 | Xu | B66F 17/006 |
| 2018/0180128 | A1* | 6/2018 | Robson | B25D 17/24 |
| 2018/0238024 | A1* | 8/2018 | Takigawa | F02D 29/06 |
| 2018/0282968 | A1* | 10/2018 | Hita | B60L 1/00 |
| 2019/0360179 | A1* | 11/2019 | Moriki | E02F 3/43 |

FOREIGN PATENT DOCUMENTS

| | | |
|---|---|---|
| JP | 2007-092763 A | 4/2007 |
| JP | 2012-087541 A | 5/2012 |

OTHER PUBLICATIONS

Xu et al., Dual-use mobile detachable manipulator-(DM)/sup 2/, 1994, IEEE, p. 255-260 (Year: 1994).*

Ha et al., Robotic excavation in construction automation, 2002, IEEE, p. 20-28 (Year: 2002).*

Moon, Input shaping control for suppression of boom vibrations, 2012, IEEE, p. 782-785 (Year: 2012).*

International Search Report of PCT/JP2016/083285 dated Jan. 31, 2017.

* cited by examiner

FIG. 6
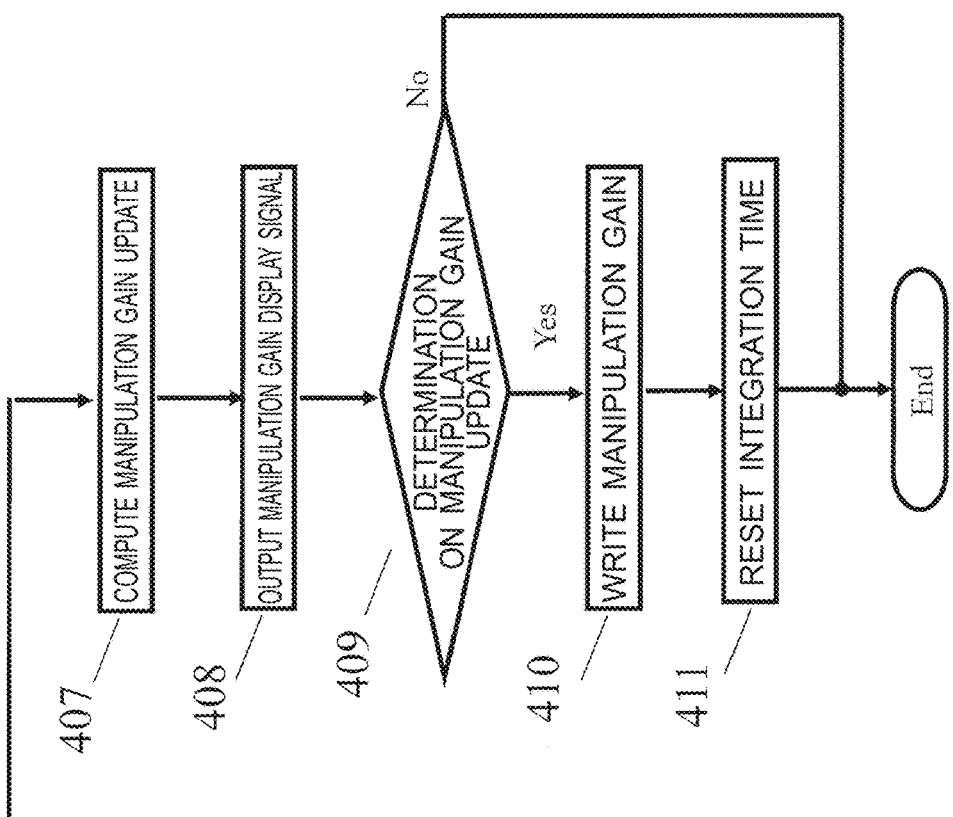
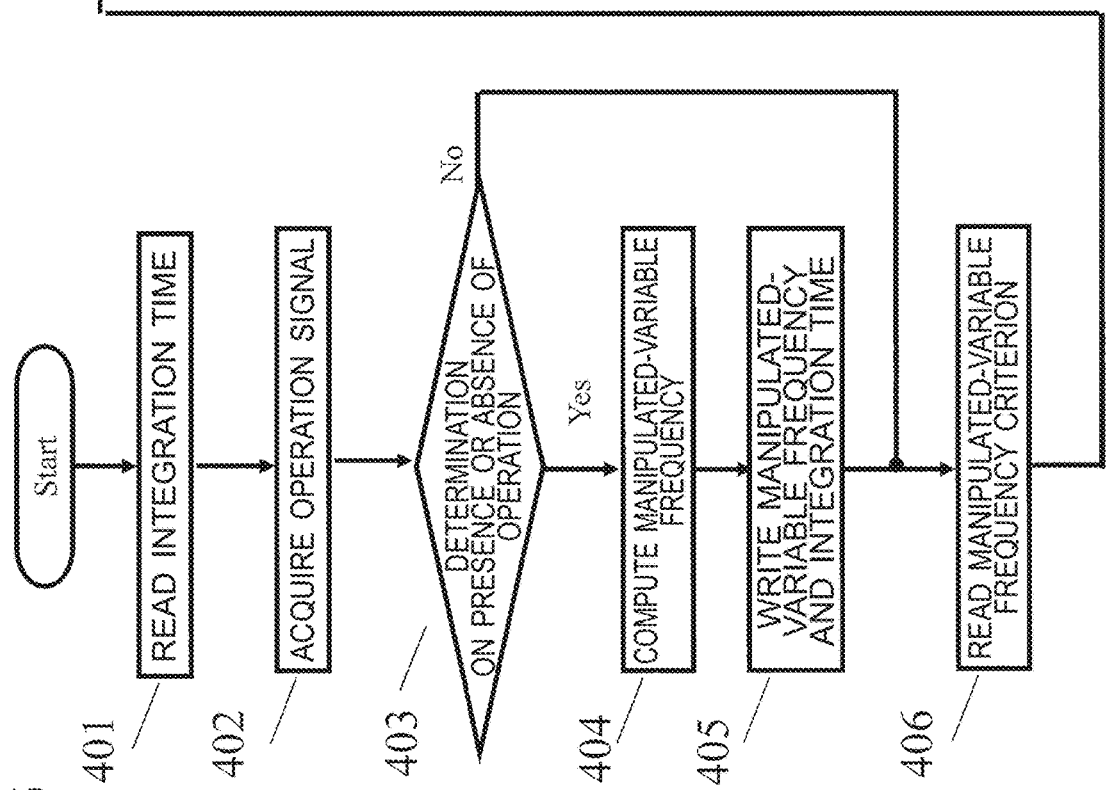

WORK MACHINE OPERATION ASSISTANCE DEVICE

TECHNICAL FIELD

The present invention relates to a work machine operation assistance device used in earthmoving work, demolition work, construction work and the like.

BACKGROUND ART

In a work machine such as a hydraulic excavator and a crane, the driving of an actuator installed in each joint of a working arm (working device) is instructed in accordance with manipulation input of a machine operator. In most cases, manipulation gain defining the relationship between the manipulation input and the driving state of the actuator is a fixed value uniquely specified before product shipment, which cannot be freely changed by the operator. The manipulation gain is set to be an average and general-purpose value in light of every condition under which the work machine is used.

However, in actual fact, an optimum manipulation gain depends on use circumstances such as "a skill level and/or habits of an operator" and "work contents", and therefore techniques have been developed to set a manipulation gain in an arbitrary manner. For example, Patent Literature 1 describes a configuration in which a manipulation gain is recoded on an IC card for each individual operator and the IC card is read by the work machine to enable arbitrarily setting a manipulation gain.

CITATION LIST

Patent Literature

PATENT LITERATURE 1: JP-A No. H9-69002

SUMMARY OF INVENTION

Technical Problem

According to Patent Literature 1, the arbitrary setting of the manipulation gain is possible, but there is a problem that satisfactory working efficiency cannot be achieved because no one knows how to make setting appropriate for a skill level and habits of an operator and/or actual work contents. That is, in Patent Literature 1, consistently, an individual can arbitrarily set simply a manipulation gain, and therefore, there is still room for improvement in that an optimum manipulation gain cannot be set in contemplation of a skill level and habits of an operator and/or actual work contents.

The present invention has been made in view of the foregoing circumstances, and it is an object of the present invention to provide a work machine operation assistance device which enables setting manipulation gain appropriate for a skill level and habits of an operator and/or actual work contents.

Solution to Problem

To attain the above object, a major aspect of the present invention provides a work machine operation assistance device installed in a work machine which has a working device driven by an actuator and an operating device to operate the actuator, to assist an operator in operating the operating device. The work machine operation assistance device includes: a manipulation gain storage section that stores manipulation gain for determining a drive speed of the actuator in relation to a manipulated variable of the operating device; a manipulated variable detection section that detects a manipulated variable of the operating device; a time integration section that adds up time that the operating device is operated; a manipulated-variable frequency arithmetic section that computes a manipulated-variable frequency of the operating device on the basis of the manipulated variable detected by the manipulated variable detection section and a time integration value obtained at the time integration section; a manipulated-variable frequency criterion setting section that presets a criterion value for the manipulated-variable frequency; a manipulation gain update arithmetic section that performs a computation to update the manipulation gain by use of the manipulated-variable frequency obtained at the manipulated-variable frequency arithmetic section and the criterion value set at the manipulated-variable frequency criterion setting section; manipulation gain display section that displays a result of the manipulation gain computed by the manipulation gain update arithmetic section; and a manipulation gain update selection section to select whether or not the manipulation gain stored in the manipulation gain storage section is updated to the manipulation gain displayed on the manipulation gain display section.

Advantageous Effects of Invention

According to the present invention, because manipulation gain appropriate for a skill level and habits of an operator and/or actual work contents is capable of being set by making reference to the manipulated-variable frequency, the working efficiency will be enhanced. These and other issues, configurations and advantages will be apparent from a reading of the following description of embodiments.

BRIEF DESCRIPTION OF DRAWINGS

FIG. 6 is a flowchart illustrating the procedure of manipulation gain update processing according to the first embodiment.

DESCRIPTION OF EMBODIMENTS

First Embodiment

Configuration Overview

Figure 1:
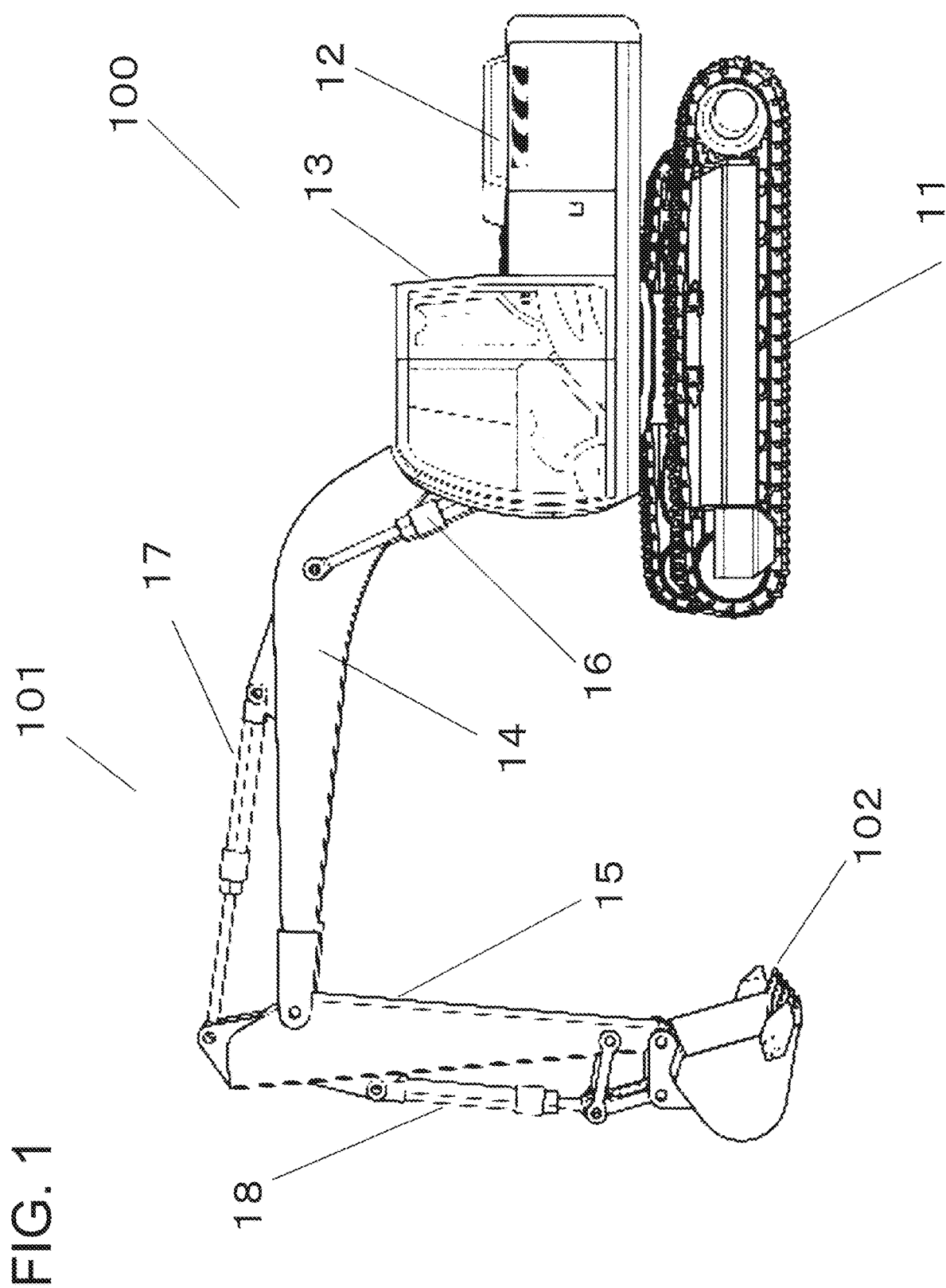
FIG. 1 is a side view of a work machine equipped with a work machine operation assistance device according to a first embodiment of the present invention.

FIG. 1 is a side view of a work machine equipped with a work machine operation assistance device according to the first embodiment. A work machine 100 has an undercarriage 11 including a left travel base and a right travel base which are not shown, and an upper structure 12 mounted turnably on the undercarriage 11. A cab 13 is installed in a front portion of the upperstructure 12. An engine, a pump and the like, which are not shown, are installed in a rear portion of the upperstructure 12. Further, a working front (working device) 101 is attached to the front portion of the upperstructure 12 in a vertical swingable (raising/lowering motion) manner.

Front Configuration

The working front 101 has: a boom 14 attached to the upperstructure 12 in a vertical swingable manner; an arm 15 attached to the boom 14 in a vertical swingable manner; a working tool 102 attached to the arm 15 in a vertical swingable manner; a boom cylinder 16 coupled to the upperstructure 12 and the boom 14 and causing the boom 14 to swing in the vertical direction; an arm cylinder 17 coupled to the boom 14 and the arm 15 and causing the arm 15 to swing in the vertical direction; and a working tool cylinder 18 coupled to the arm 15 and the working tool 102 and causing the working tool 102 to swing in the vertical direction. All of the boom cylinder 16, the arm cylinder 17 and the working tool cylinder 18 correspond to "actuators" of the present invention.

Incidentally, the working tool 102 can be replaced with any one of a cutter, a breaker, a grapple, and another working tool in addition to a bucket as illustrated in the figure, according to the work contents of the work machine 100.

Basic Configuration of Control Circuit

Figure 2:
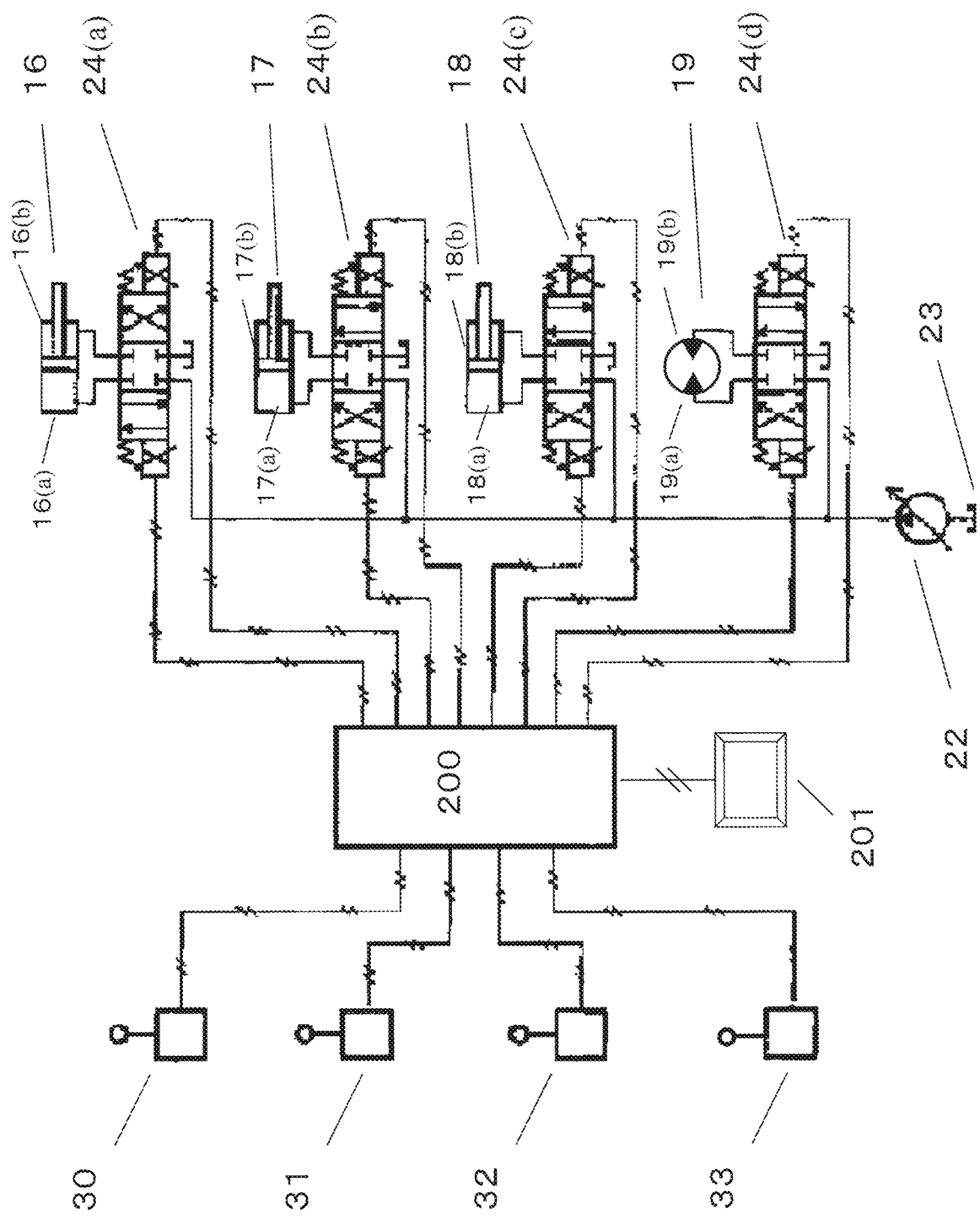
FIG. 2 is a block diagram of a control circuit of a hydraulic drive system of the work machine shown in FIG. 1.

FIG. 2 is a block diagram of a control circuit of a hydraulic drive system of the work machine 100 shown in FIG. 1. In the control circuit illustrated in FIG. 2, reference sign 22 denotes a main pump driven by an engine, not shown. The main pump 22 sucks hydraulic oil stored in a hydraulic oil tank 23, in order to supply pressure oil to each piece of the equipment. More specifically, the pressure oil discharged from the main pump 22 is supplied through a control valve 24 to each of the boom cylinder 16, the arm cylinder 17, the working tool cylinder 18 and a swing motor 19.

Actuator Drive

Upon supply of the pressure oil to a bottom-side oil chamber 16 (a) of the boom cylinder 16, the boom 14 is driven to swing upward with respect to the upperstructure 12. Meanwhile, upon supply of the pressure oil to a rod-side oil chamber 16 (b), the boom 14 is driven to swing downward with respect to the upperstructure 12. Upon supply of the pressure oil to a bottom-side oil chamber 17(a) of the arm cylinder 17, the arm 15 is driven to swing downward with respect to the boom 14. Meanwhile, upon supply of the pressure oil to a rod-side oil chamber 17(b), the arm 15 is driven to swing upward with respect to the boom 14.

Upon supply of the pressure oil to a bottom-side oil chamber 18 (a) of the working tool cylinder 18, the working tool 102 is driven to rotate downward with respect to the arm 15. Meanwhile, upon supply of the pressure oil to a rod-side oil chamber 18(b), the working tool 102 is driven to rotate upward with respect to the arm 15. Upon supply of the pressure oil to an oil chamber 19(a) of the swing motor 19, the upperstructure 12 swings rightward with respect to the undercarriage 11. Meanwhile, upon supply of the pressure oil to an oil chamber 19 (b), the upperstructure 12 swings leftward with respect to the undercarriage 11.

Control System

Figure 3:
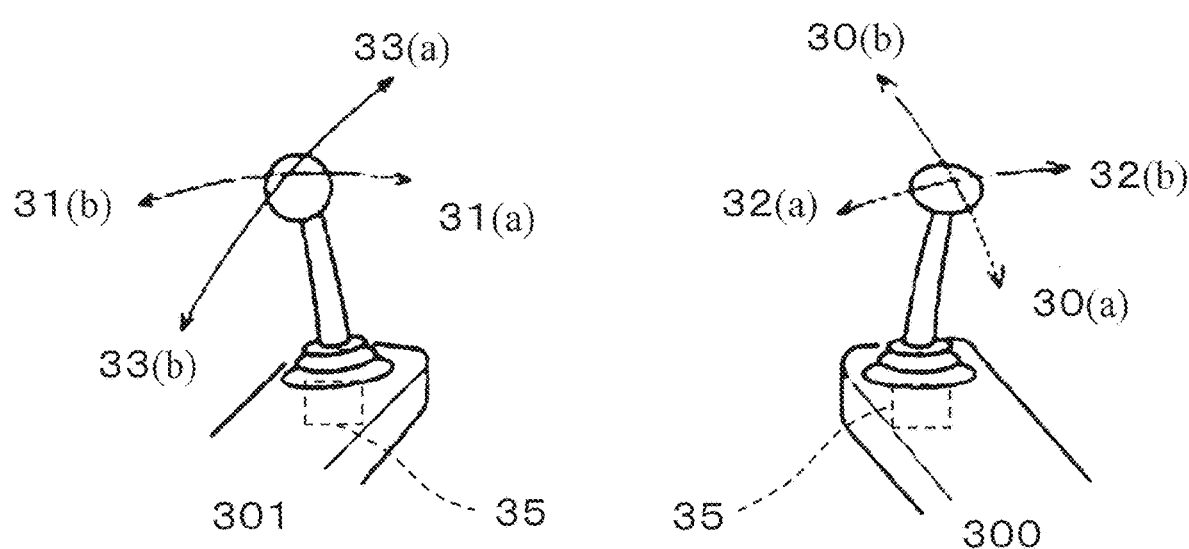
FIG. 3 is a schematic illustration of left and right operating levers.

The opening/closing operations of the control valves 24(a) to 24 (d) are respectively controlled through a controller 200 on the basis of the manipulated variables of a boom operating lever 30, an arm operating lever 31, a working tool operating lever 32 and a swing operating lever 33 which are operating devices. FIG. 3 is a schematic illustration of left and right operating levers. In the right operating lever 300 illustrated in FIG. 3, moving the boom operating lever 30 toward the rear (a) causes a flow rate of pressure oil corresponding to the manipulate variable to be supplied into the bottom-side oil chamber 16 (a) of the boom cylinder 16. In reverse, moving the boom operating lever 30 toward the front (b) causes a flow rate of pressure oil corresponding to the manipulated variable to be supplied into the rod-side oil chamber 16(b) of the boom cylinder 16.

Moving the working tool operating lever 32 toward the left (a) causes a flow rate of pressure oil corresponding to the manipulate variable to be supplied into the bottom-side oil chamber 18(a) of the working tool cylinder 18. In reverse, moving the working tool operating lever 32 toward the right (b) causes a flow rate of pressure oil corresponding to the manipulated variable to be supplied into the rod-side oil chamber 18(b) of the working tool cylinder 18.

In the left operating lever 301 illustrated in FIG. 3, moving the arm operating lever 31 toward the right (a) causes a flow rate of pressure oil corresponding to the manipulate variable to be supplied into the bottom-side oil chamber 17(a) of the arm cylinder 17. In reverse, moving the arm operating lever 31 toward the left (b) causes a flow rate of pressure oil corresponding to the manipulated variable to be supplied into the rod-side oil chamber 17(b) of the arm cylinder 17.

Moving the swing operating lever 33 toward the front (a) causes a flow rate of pressure oil corresponding to the manipulate variable to be supplied into the oil chamber 19(a) of the swing motor 19. In reverse, moving the swing operating lever 33 toward the rear (b) causes a flow rate of pressure oil corresponding to the manipulated variable to be supplied into the oil chamber 19(b) of the swing motor 19. It is noted that the right operating lever 300 and the left operating lever 301 are provided respectively with potentiometers (manipulated variable detection section) 35 to detect each manipulated variable.

Operation Control System

Figure 4:
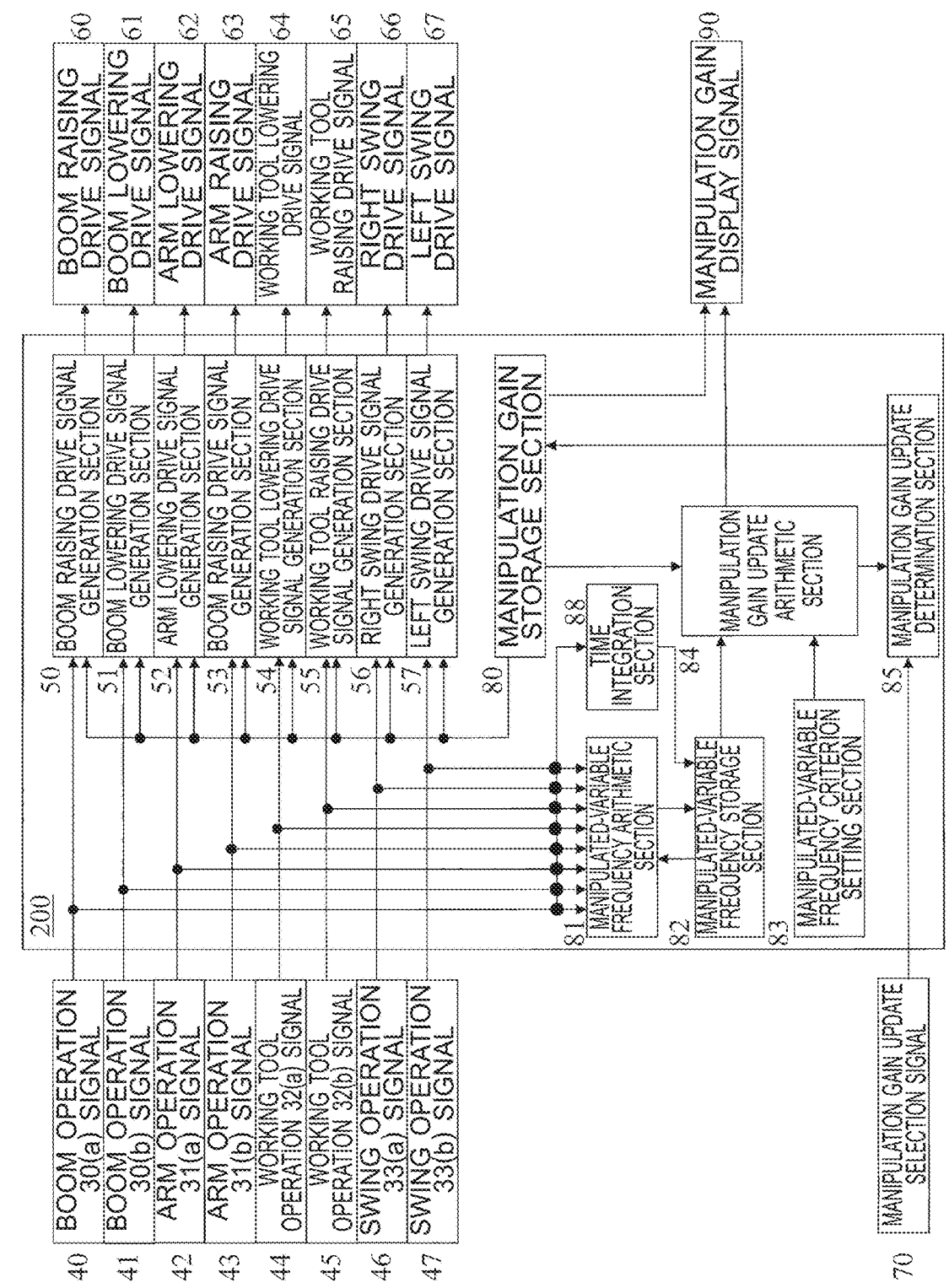
FIG. 4 is a block diagram illustrating an operation control system related to the input/output of a controller of the work machine operation assistance device according to the first embodiment.

FIG. 4 is a block diagram illustrating an operation control system related to the input/output of a controller of the work machine operation assistance device according to the first embodiment. Reference signs 40 to 47 as input to the controller 200 are operation signals detected by the potentiometers 35 (see FIG. 3). Reference signs 60 to 67 as output from the controller 200 are drive signals to drive respectively the above-described boom cylinder 16, arm cylinder 17, working tool cylinder 18 and swing motor 19. Reference signs 50 to 57 shown within the controller 200 are drive signal generation sections to compute the respective drive signals from the corresponding operation signals.

As illustrated in FIG. 4, the controller 200 also includes a manipulation gain storage section 80, a manipulated-variable frequency arithmetic section 81, a manipulated-variable frequency storage section 82, a manipulated-variable frequency criterion setting section 83, a manipulation gain update arithmetic section 84, a manipulation gain update determination section 85, and a time integration section 88. The manipulation gain storage section 80 stores: manipulation gain for determining a drive speed of the boom cylinder 16 in relation to the manipulated variable of the boom operating lever 30; manipulation gain for determining a drive speed of the arm cylinder 17 in relation to the manipulated variable of the arm operating lever 31; manipulation gain for determining a drive speed of the working tool cylinder 18 in relation to the manipulated variable of the working tool operating lever 32; and manipulation gain for determining a drive speed of the swing motor 19 in relation to the manipulated variable of the swing operating lever 33.

Figure 5:
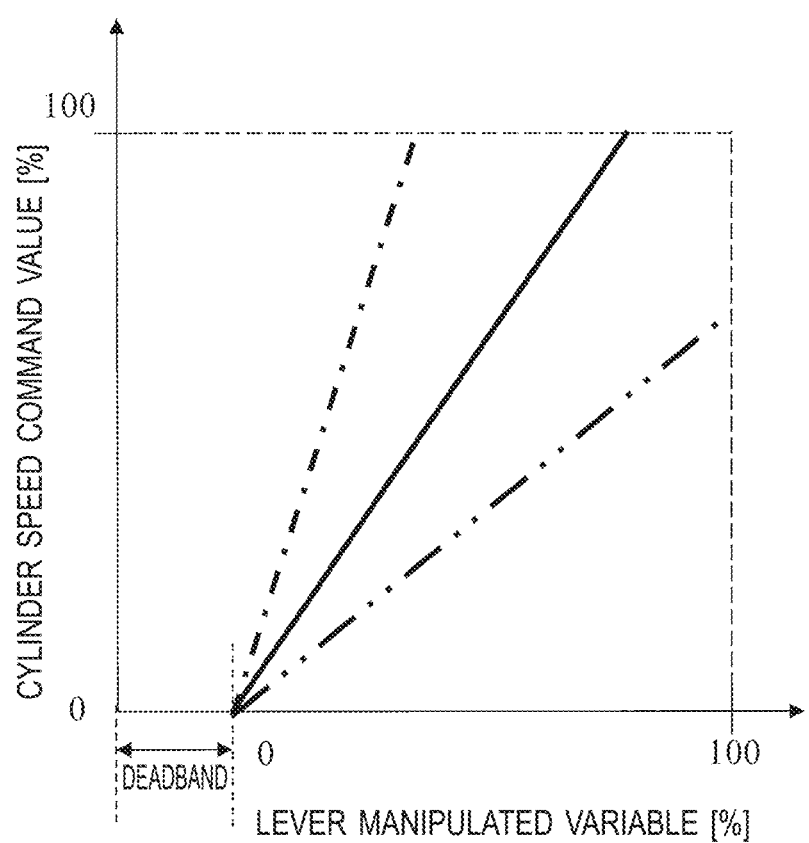
FIG. 5 is a graph illustrating the relationship between a lever manipulated variable and a cylinder speed command value.

FIG. 5 is a graph illustrating the relationship between the lever manipulated variable and the cylinder speed command value (manipulation gain map), which is a diagram for illustrating the setting of the manipulation gain according to the present embodiment. As illustrated in FIG. 5, a cylinder speed command value proportional to the manipulated variable of the operating lever is calculated as a drive signal. It is noted that a deadband is established to define a manipulate variable at which the lever operation is made effective. Such a data map illustrated in FIG. 5 is stored in the manipulation gain storage section 80. Specifically, a manipulation gain map for each of the above-described operating levers 30 to 33 is stored in the manipulation gain storage section 80. Then, drive signal generation sections 50 to 57 output respectively drive signals 60 to 67 based on the corresponding manipulation gain maps stored in the manipulation gain storage section 80.

Changing the manipulation gain map enables changing the relationship between the lever manipulated variable and the cylinder speed. According to the manipulation gain indicated by a dash-dot line in FIG. 5, the manipulation gain has a greater slope than an early-stage manipulation gain indicated by a solid line, so that a high cylinder speed can be obtained even when the manipulated variable is small. Meanwhile, according to the manipulation gain indicated by a dash-dot-dot line, the manipulation gain has a smaller slope than the early-stage manipulation gain indicated by the solid line, so that with the small manipulated variable, a lower cylinder speed can be obtained. The former is suitable for the work focusing on speed response, and the latter is suitable for the work focusing on delicate controllability.

Referring to FIG. 4 again, the manipulated-variable frequency arithmetic section 81 receives the operation signals as input from the boom operating lever 30, the arm operating lever 31, the working tool operating lever 32 and the swing operating lever 33, and computes the manipulated-variable frequency of each operating lever 30, 31, 32, 33. The manipulated-variable frequency storage section 82 stores: the manipulated-variable frequency of each operating lever 30, 31, 32, 33 computed by the manipulated-variable frequency arithmetic section 81; and an integrated value representing a time period over which each operating lever 30, 31, 32, 33 is operated (which may be hereinafter referred to as "integration time"), the integrated value having been calculated at the time integration section 88. The manipulated-variable frequency criterion setting section 83 presets a criterion value for the manipulated-variable frequency.

Here, in the configuration in the present embodiment, the criterion value is preset by the manipulated-variable frequency criterion setting section 83. The term "presetting/to preset" here includes, for example, the case where a criterion value is set before the work machine 100 leaves the factory and the criterion value is used in the market as a fixed value without any change, and the case where a criterion value is changeable, specifically, where the manipulated-variable frequency criterion setting section 83 sets a predetermined criterion value by an input signal from a, not-shown, setting key or the like in the cab 13. It is noted that in the "changeable" case, in this manner, a criterion value can be set as appropriate, from which enhanced working efficiency may be expected.

The manipulation gain update arithmetic section 84 uses the manipulated-variable frequency stored in the manipulated-variable frequency storage section 82, and a criterion value A (see FIG. 8) set by the manipulated-variable frequency criterion setting section 83, to perform a computation to update the manipulation gain. The manipulation gain update arithmetic section 84 then outputs the computation result as a manipulation gain display signal 90 to a display monitor 201 (a manipulation gain display section, see FIG. 10). The manipulation gain update determination section 85 receives a manipulation gain update selection signal 70 as input from a manipulation gain update button 204 (a manipulation gain update selection section, see FIG. 10), and determines whether or not the manipulation gain is updated.

Here is a supplementary explanation on how to set the criterion value A. For example, if a criterion value A is set by reference to the manipulated-variable frequency of each operating lever 30, 31, 32, 33 operated by an expert, the manipulation gain is updated based on a difference between the criterion value A and the manipulated-variable frequency of each operating lever 30, 31, 32, 33 operated by a beginner. Because of this, even the beginner can operate the operating levers 30 to 33 on the pattern of the manipulated-variable frequency of the expert. In a concrete example, in the beginner's operation of each of the operating levers 30 to 33, the manipulated-variable frequency in 0% to 20% is higher than that of the expert. In other words, the frequency of finely operating the operating lever is increased. This will result in a reduction in working efficiency. To avoid this, if a criterion value A for the manipulated-variable frequency in a band of 0% to 20% is preset to be, for example, 50%, the manipulation gain is updated based on the criterion value A and the manipulated-variable frequency of the beginner, and it follows that the manipulated-variable frequency in the band of 0% to 20% becomes similar to that of the expert. In consequence, even the beginner can follow the tendency of the manipulated-variable frequency of the expert, thus preventing a reduction in working efficiency.

Further, if the criterion value A is required to be set individually for each operator as appropriate, the setting key in the cab 13 may be operated as described above to set any criterion value A suitable for a skill level of the operator to increase the working efficiency, such that the criterion value A is set to be 40% for one operator and the criterion value A is set to be 35% for another operator. In this manner, in the present embodiment, an unprecedented feature is the configuration in which a value to offer improved working efficiency can be preset or arbitrarily set as a criterion value A for the manipulated-variable frequency by the operator.

Calculation of Manipulated-Variable Frequency

FIG. 6 is a flowchart illustrating the procedure of manipulation gain update processing according to the first embodiment. The flowchart illustrated in FIG. 6 is executed at every predetermined sampling time in the controller 200. For instance, if the sampling time is 0.1 seconds, the processing in FIG. 6 is executed once every 0.1 seconds.

In block 401 to block 405, the processing involving the manipulated-variable frequency arithmetic section 81 illustrated in FIG. 4 is performed. Initially, in block 401, the manipulated-variable frequency arithmetic section 81 reads the integration time stored in the manipulated-variable frequency storage section 82.

In block 402, the manipulated-variable frequency arithmetic section 81 captures each operation signal 40, 41, 42, 43, 44, 45, 46, 47. In block 403, the operation signal captured in block 402 is used to make a determination as to the presence or absence of the corresponding lever operation by the manipulated-variable frequency arithmetic section 81. If the lever operation exceeding the deadband shown in FIG. 5 is performed, the processing proceeds to block 404, but if the operation exceeding the deadband is not performed, the processing proceeds to block 406.

Figure 7:
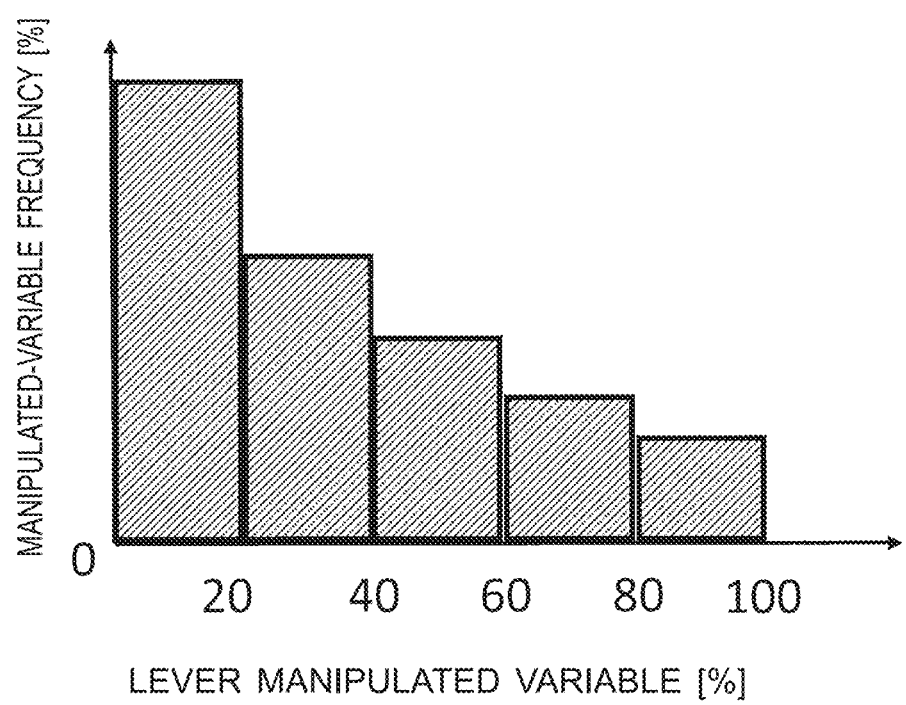
FIG. 7 is a graph illustrating a specific example of the relationship between the lever manipulated variable and the manipulated-variable frequency.

In block 404, the integration time read in block 401 and the current operation signal captured in block 402 are used to cause the manipulated-variable frequency arithmetic section 81 to compute the manipulated-variable frequency at every sampling time. FIG. 7 is a graph illustrating a concrete example of the relationship between the lever manipulated variables and the manipulated-variable frequency. In the present embodiment, the manipulated-variable frequency for each operation signal from the corresponding operation lever 30, 31, 32, 33 is stored in a form as illustrated in FIG. 7. The manipulated-variable frequency is determined for each lever at a ratio between two integration values, for example, one representing a time period over which the lever is operated in each of 20% zones into which the use band of lever manipulated variable is divided, the other integration value representing a time period over which the lever is operated in the entire use band (which may be hereinafter referred to as the "entire band"). For the purpose of a description of the manipulated-variable frequency computation, the integration time in the use band (e.g., 0% to 20%) of the lever manipulated variable illustrated in FIG. 7 is defined as T1, the integration time in the entire band is defined as T, and the sampling time of the controller 200 is defined as t. The integration time T1 is an integration value representing a time period over which the manipulated variable of a certain lever of the levers is manipulated in a certain use band, while the integration time T is an integration value representing a time period over which the manipulated variable of the certain lever is operated in the entire use band.

If the presence of the lever operation is determined in block 403, a sampling time t is added to the integration time T1 and T obtained in the last calculation (hereinafter, T1ex and Tex). The preceding integration times T1ex and Tex are stored in the manipulated-variable frequency storage section 82. In a computation related to the use range (0% to 20%), the manipulated-variable frequency when this range is used is calculated from a ratio between the integration time T1=(T1ex+t) and the integration time T=(Tex+t) as described above, that is, T1/T=(T1ex+t)/(Tex+t). In block 405, the integration times T1 and T and the manipulated-variable frequency which is the computation result in block 404 are processed to be stored in the manipulated-variable frequency storage section 82. It is noted that the manipulated-variable frequency and the integration times T1, T may be stored in different storage sections. The preceding manipulated-variable frequency is erased by writing a newly calculated manipulated-variable frequency over it.

Manipulation Gain Update

Figure 8:
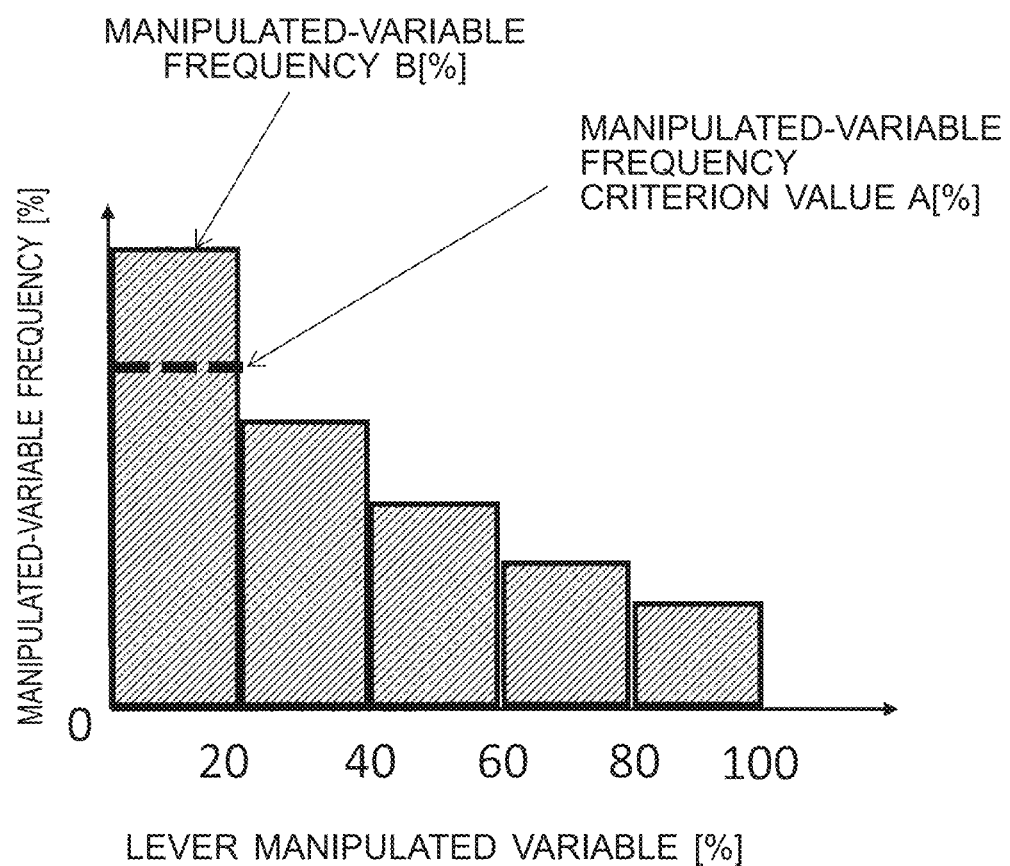
FIG. 8 is a graph illustrating a manipulated-variable frequency criterion value A in regard to the relationship between the lever manipulated variable and the manipulated-variable frequency.

In block 406 and block 407, the processing involving the manipulation gain update arithmetic section 84 illustrated in FIG. 4 is performed. In block 406, the manipulation gain update arithmetic section 84 reads the manipulated-variable frequency criterion value A preset (stored) in the manipulated-variable frequency criterion setting section 83. FIG. 8 is a graph illustrating the manipulated-variable frequency criterion value A in regard to the relationship between the lever manipulated variable and the manipulated-variable frequency. As illustrated in FIG. 8, the manipulated-variable frequency criterion value A is set in the use band (0% to 20%) of the lever manipulated variable.

Figure 9:
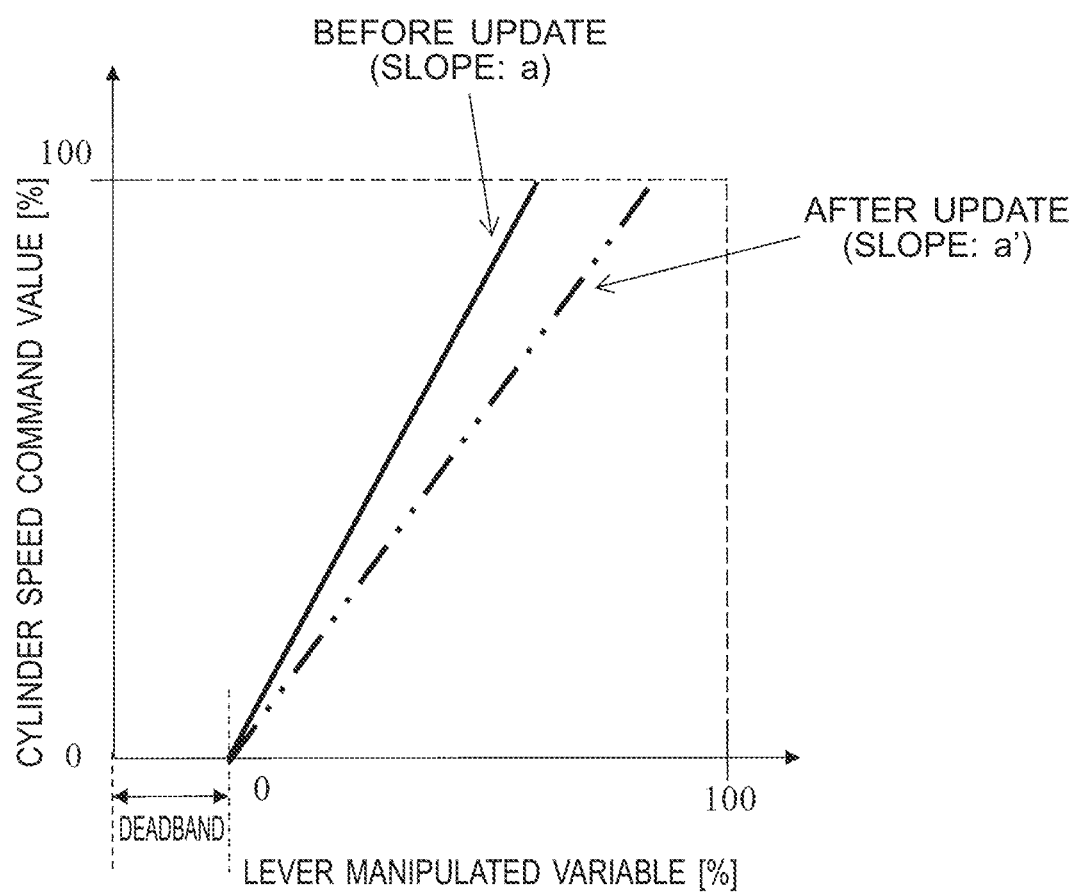
FIG. 9 is a graph illustrating the relationships between the lever manipulated variables and the cylinder speed command values after and before update.

In block 407, both the manipulated-variable frequency B % stored in the manipulated-variable frequency storage section 82 and the manipulated-variable frequency criterion value A % read in block 406 are used to cause the manipulation gain update arithmetic section 84 to compute for updating of the manipulation gain. FIG. 9 is a graph illustrating the relationships between the lever manipulated variables and the cylinder speed command values after and before update. As illustrated in FIG. 9, if a slope before update (the manipulation gain stored in the manipulation gain storage section 80) is defined as a, and a slope after update is defined as a', a' can be calculated by the following formula.

$$a' = a \times (100 - (B - A))/100 \qquad (1)$$

Given that the manipulated-variable frequency criterion value A is equal to 35% and the manipulated-variable frequency B is equal to 45%, the slope after update results in a'=0.9a. Where the manipulated-variable frequency B % is greater than the manipulated-variable frequency criterion value A %, the slope determining the manipulation gain on the basis of the difference between them decreases. As the slope decreases, a larger lever manipulated variable is required to obtain the same speed command value. Because of this, as long as the same operator performs the same work, imbalance in the manipulated-variable frequency is regulated.

Meanwhile, where the manipulated-variable frequency B % is less than the manipulated-variable frequency criterion value A %, the slope determining the manipulation gain on the basis of the difference between them increases. As the slope increases, the same speed command value can be obtained by use of a smaller lever manipulated variable. Because of this, as long as the same operator performs the same work, imbalance in the manipulated-variable frequency is regulated.

Manipulation Gain Display

As illustrated in FIG. 6, the processing involving the manipulation gain display signal 90 illustrated in FIG. 4 is performed. In the control circuit illustrated in FIG. 2, a display monitor 201 is connected to the controller 200. In block 408, a signal is output in order to display, on the display monitor 201, the manipulation gain value which is stored in the manipulation gain storage section 80 and the manipulation gain value which is the computation result of the manipulate gain update arithmetic section 84 (the manipulation gain display signal 90).

Figure 10:
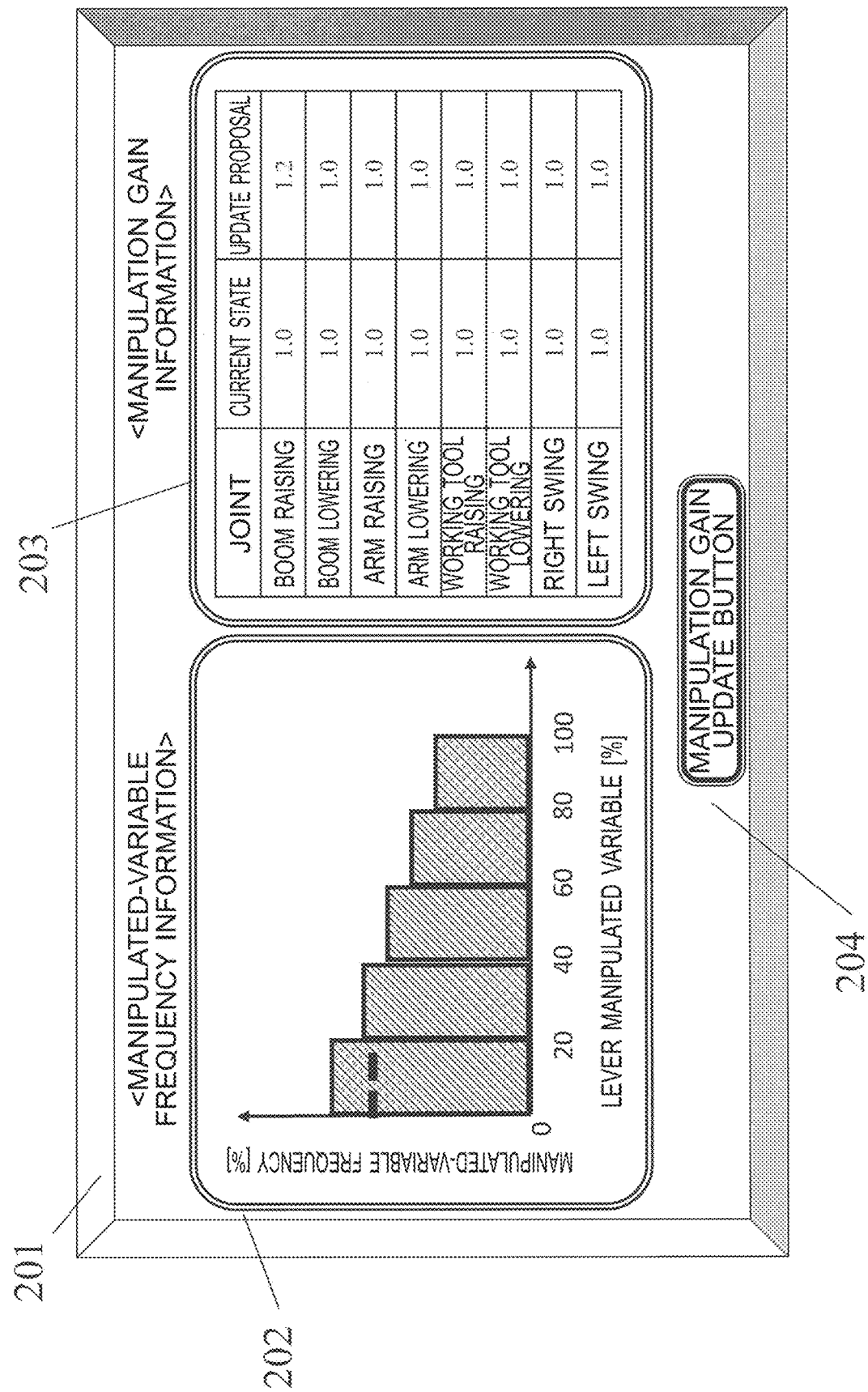
FIG. 10 is a diagram illustrating a display form of a display monitor in the work machine operation assistance device according to the first embodiment.

FIG. 10 is a diagram illustrating a display form of a display monitor in the work machine operation assistance device according to the first embodiment. As illustrated in FIG. 10, an area for a manipulated-variable frequency information display section 202 and an area for a manipulation gain information display section 203 are defined and formed in the display monitor 201. In the manipulated-variable frequency information display section 202, displayed are the manipulated-variable frequency which is stored in the manipulated-variable frequency storage section 82 and the manipulated-variable frequency criterion value which is stored in the manipulated-variable frequency criterion setting section 83. In the manipulation gain information display section 203, displayed is a list of the manipulation gain values which are stored in the manipulation gain storage section 80 (the slope a in FIG. 9), and the manipulation gain values which are the computation results of the manipulation gain update arithmetic section 84 (the slope a' in FIG. 9).

Specifically, relating to the operation of each joint of the boom 14, the arm 15 and the working tool 102 and the swing operation of the upperstructure 12, the numeric values (proportional gain values) indicating the current manipulation gain and the update proposals are displayed in list form. For example, in FIG. 10, the display monitor 201 gives an indication that the current manipulation gain for the boom raising operation is 1.0, and a manipulation gain suggested based on the actual manipulated-variable frequency of the boom operating lever 30 is 1.2. That is, a proposal to recommend a 1.2 manipulation gain (proportional gain value) is made via the display monitor 201. Meanwhile, for example, for the working-tool raising operation, both of the current manipulation gain value and the suggested manipulation gain value are the same 1.0. This means that the current manipulation gain is appropriate for the actual work contents.

Manipulation Gain Update

In block 409 to block 411 in FIG. 6, the processing involving the manipulation gain update determination section 85 illustrated in FIG. 4 is performed. In block 409, a determination on whether or not the manipulation gain is updated is made. The manipulation gain update determination section 85 has fetched a manipulation gain update selection signal 70 associated with a manipulation gain update button 204 illustrated in FIG. 10. Upon press of the manipulation gain update button 204, the processing proceeds to block 410.

In block 410, the manipulated gain stored in the manipulation gain storage section 80 is processed to be overwritten with the computation result of the manipulation gain update arithmetic section 84. In block 411, then, the integration times T1 and T stored in the manipulated-variable frequency storage section 82 are processed to be reset to zero.

According to the first embodiment configured as described above, manipulation gain update proposals which have been determined by making reference to the manipulated-variable frequency are displayed on the display monitor 201. The operator in the cab 13 may look at the display monitor 201 and set an appropriate manipulation gain suitable for the work contents. By doing this, the working efficiency can be enhanced because the manipulation gain set is reflective of a skill level and habits of the operator and the actual work contents.

Second Embodiment

Figure 11:
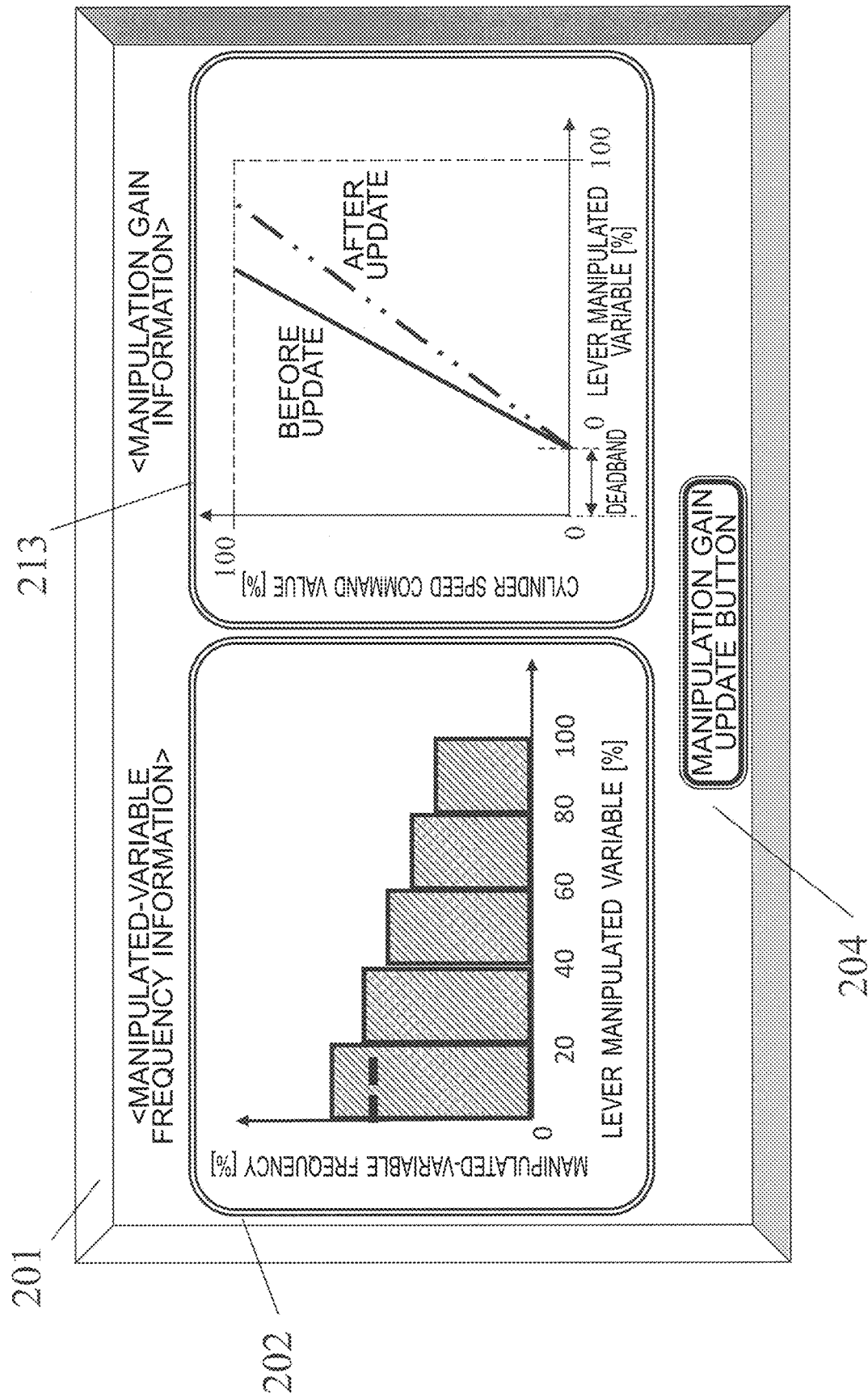
FIG. 11 is a diagram illustrating a display form of a display monitor in a work machine operation assistance device according to a second embodiment.

The following is a description of a work machine operation assistance device according to a second embodiment of the present invention. Incidentally, a description of portion overlapping the first embodiment is omitted. The second embodiment differs in the display form of the display monitor 201 from the first embodiment. FIG. 11 is a diagram illustrating a display form of the display monitor in the work machine operation assistance device according to the second embodiment.

As illustrated in FIG. 11, an area for a manipulated-variable frequency information display section 202 and an area for a manipulation gain information display section 213 are defined and formed in the display monitor 201. In the manipulated-variable frequency information display section 202, displayed are the manipulated-variable frequency which is stored in the manipulated-variable frequency storage section 82 and the manipulated-variable frequency criterion value which is stored in the manipulated-variable frequency criterion setting section 83. Meanwhile, in the manipulation gain information display section 213, displayed is a manipulation gain map stored in the manipulation gain storage section 80 and a manipulation gain map which is the computation result of the manipulation gain update arithmetic section 84. It is noted that the display of the manipulation gain map displayed on the manipulation gain information display section 213 is switched among manipulation gain maps corresponding to the respective operation signals by a selector button which is not shown.

According to the second embodiment configured as described above, the manipulation gain map before and after update is presented to the operator through the display monitor 201. In consequence, the operator can easily perceive visually the state after the manipulation gain update. Because of this, a determination on whether or not the manipulation gain is updated is facilitated, leading to improved usability.

Third Embodiment

The following is a description of a work machine operation assistance device according to a third embodiment of the present invention. Incidentally, a description of portion overlapping the first embodiment is omitted. The third embodiment differs in a portion of the configuration of the controller 200 (the operation control system) from the first embodiment.

Operation Control System

Figure 12:
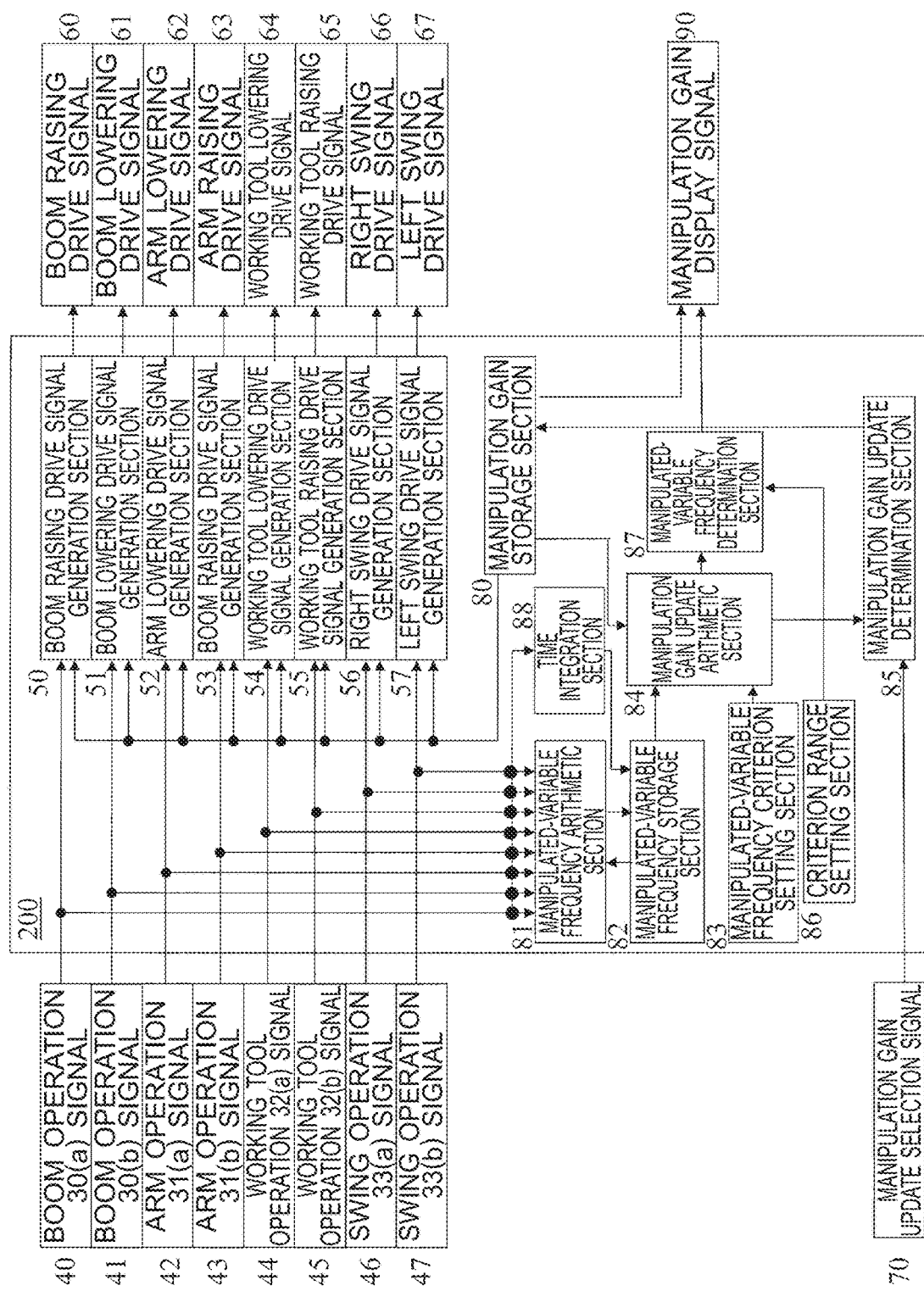
FIG. 12 is a block diagram illustrating an operation control system related to the input/output of a controller of a work machine operation assistance device according to a third embodiment.

FIG. 12 is a block diagram illustrating the operation control system related to the input/output of the controller of the work machine operation assistance device according to the third embodiment. A difference of the configuration from the first embodiment illustrated in FIG. 4 is in that a criterion range setting section 86 and a manipulated-variable frequency determination section 87 are added. In other words, the work machine operation assistance device according to the third embodiment is configured to include the criterion range setting section 86 and the manipulated-variable frequency determination section 87 in addition to the configuration of the first embodiment.

Figure 13:
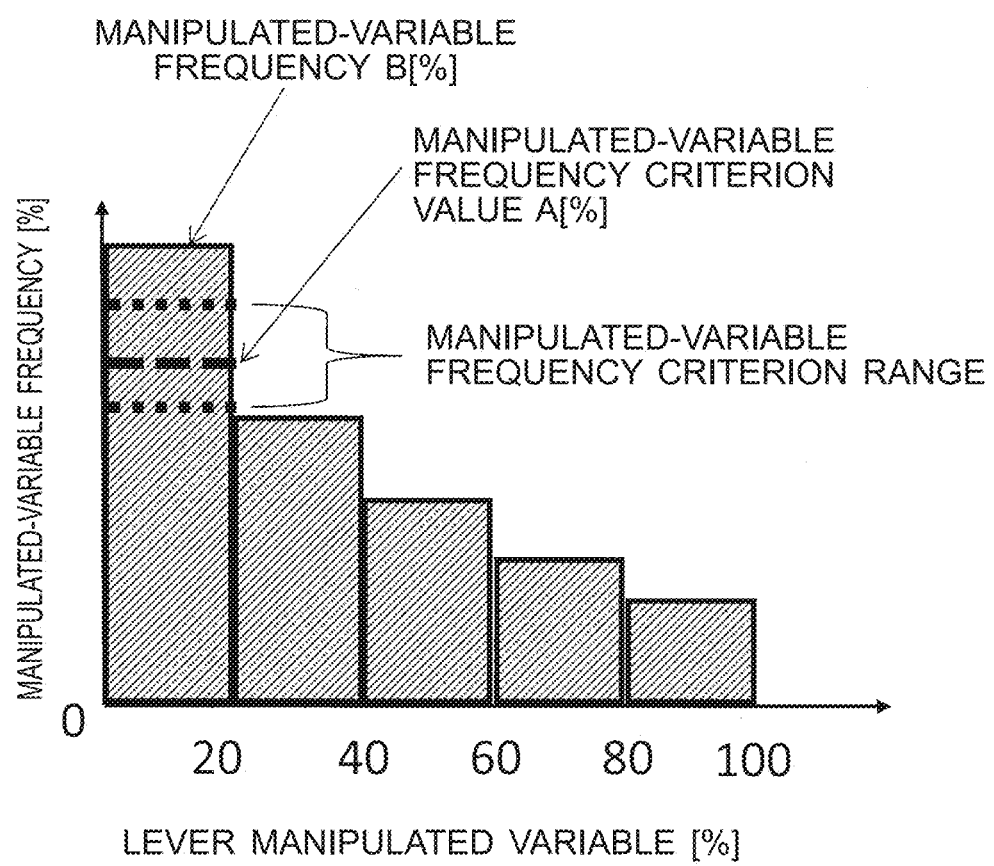
FIG. 13 is a graph illustrating a manipulated-variable frequency criterion value A and a manipulated-variable frequency criterion range in regard to the relationship between the lever manipulated variable and the manipulated-variable frequency.

FIG. 13 is a graph illustrating a manipulated-variable frequency criterion value A and a manipulated-variable frequency criterion range in regard to the relationship between the lever manipulated variable and the manipulated-variable frequency. The criterion range setting section 86 is provided for setting a criterion range as a threshold of the manipulated-variable frequency in the third embodiment. As illustrated in FIG. 13, the criterion range setting section 86 sets an upper limit threshold and a lower limit threshold between which the manipulated-variable frequency criterion value A is set, to thereby define a criterion range for a determination on whether or not the manipulation gain update is selected. The manipulated-variable frequency determination section 87 performs a determination on whether or not the computation result of the manipulation gain update arithmetic section 84 is output as a manipulation gain display signal 90.

Determination on Manipulated-Variable Frequency

Figure 14:
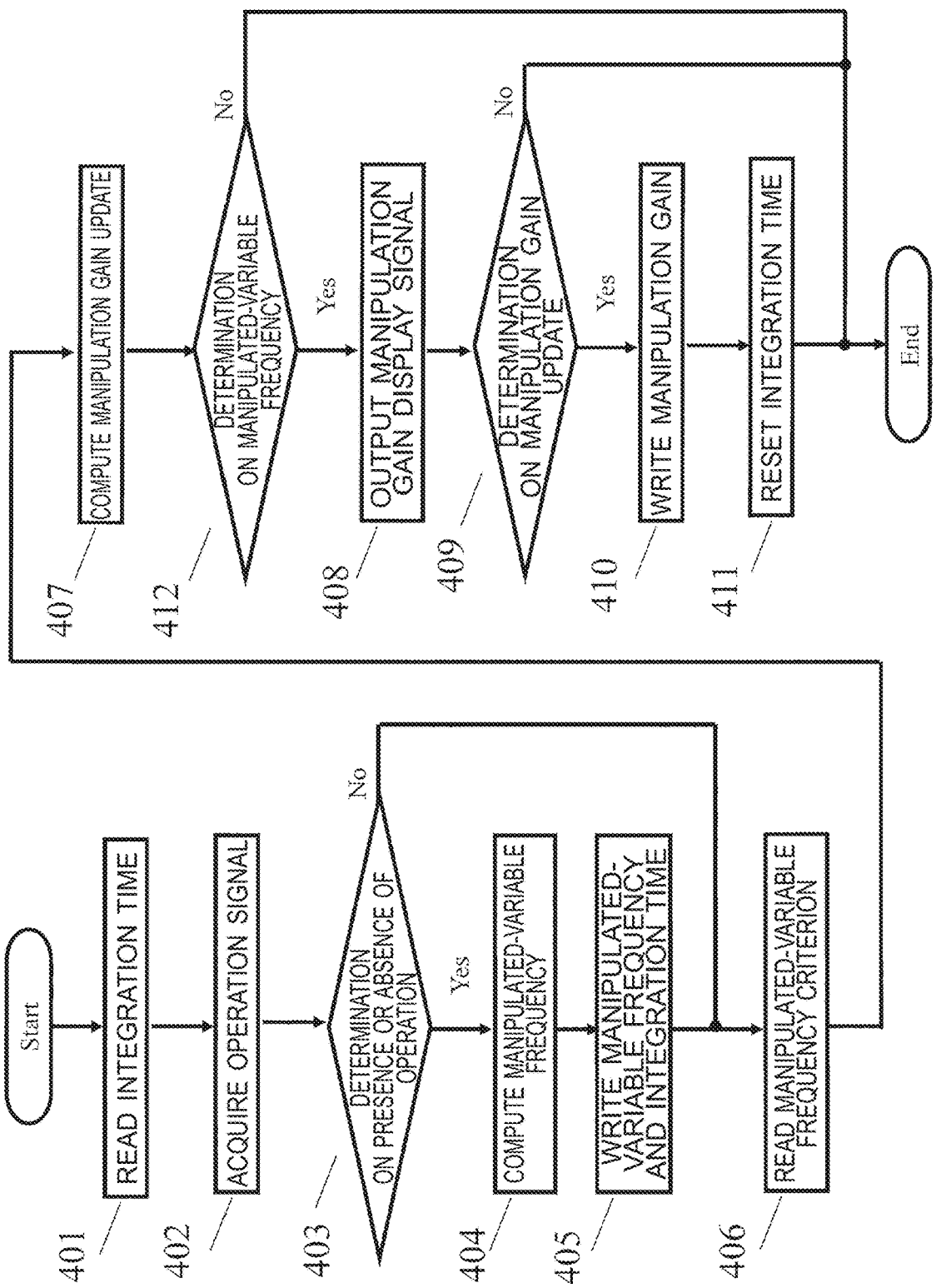
FIG. 14 is a flowchart illustrating the procedure of manipulation gain update processing according to the third embodiment.

FIG. 14 is a flowchart illustrating the procedure of the manipulation gain update processing according to the third embodiment. A difference from the first embodiment illustrated in FIG. 6 is in that block 412 is added to determine the manipulated-variable frequency. In block 412, a manipulated-variable frequency determination is performed. If the manipulated-variable frequency stored in the manipulated-variable frequency storage section 82 falls outside the criterion range set by the criterion range setting section 86 (if Yes in block 412), the processing proceeds to block 408. The processing from block 408 onward is the same as the above-described first embodiment and a description is omitted.

Figure 15:
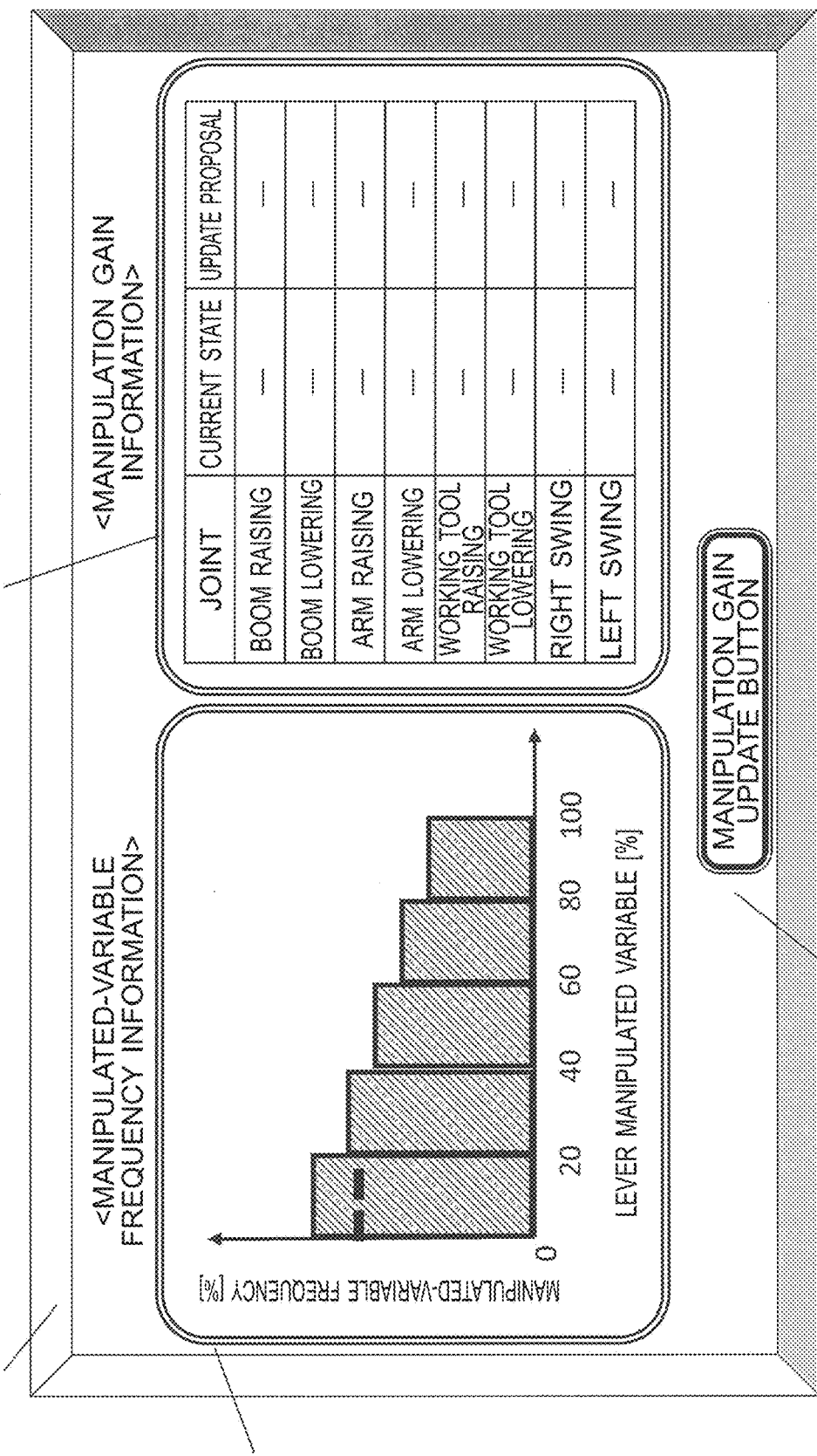
FIG. 15 is a diagram illustrating a display form of a display monitor in the work machine operation assistance device according to the third embodiment.

If the determination result in block 412 falls within the criterion range set by the criterion range setting section 86 (if No in block 412), the manipulation gain display signal 90 is not output to the display monitor 201 because the procedure skips block 408. FIG. 15 is a diagram illustrating a display form of the display monitor in the work machine operation assistance device according to the third embodiment. A difference of the display form of the display monitor 201 illustrated in FIG. 15 from that in FIG. 10 is in that the manipulation gains are not displayed in the manipulation gain information display section 223. Where block 409 is skipped as illustrated in FIG. 14, the manipulation gains are not shown, and the operation of the manipulation gain update button 204 becomes inoperative.

According to the third embodiment configured as described above, only when the manipulated-variable frequency falls outside the criterion range, a manipulation gain update is suggested. Accordingly, because a determination on whether or not the manipulation gain should be updated is performed on the work machine side, the workload of the operator is reduced.

Fourth Embodiment

The following is a description of a work machine operation assistance device according to a fourth embodiment of the present invention. Incidentally, a description of portion overlapping the first embodiment is omitted. The fourth embodiment differs in a portion of the configuration of the controller 200 (the operation control system) from the first embodiment.

Operation Control System

Figure 16:
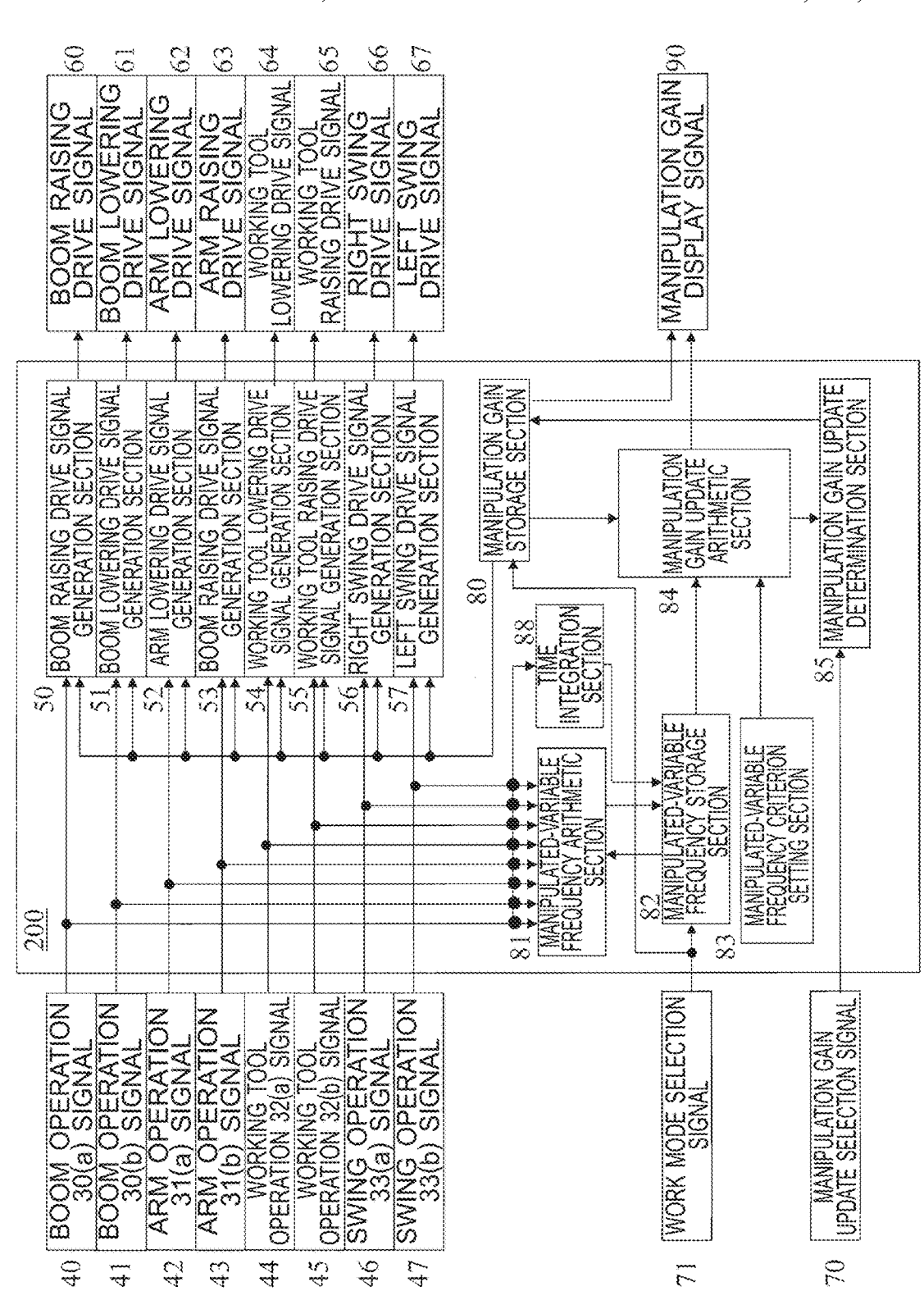
FIG. 16 is a block diagram illustrating an operation control system related to the input/output of a controller of a work machine operation assistance device according to a fourth embodiment.

FIG. 16 is a block diagram illustrating an operation control system related to the input/output of the controller of the work machine operation assistance device according to the fourth embodiment. A difference of the configuration of the controller 200 illustrated in FIG. 16 from that in FIG. 4 is in that a work mode selection signal 71 is captured by the manipulation gain storage section 80 and the manipulated-variable frequency storage section 82. Specifically, in the fourth embodiment, the work machine 100 is able to be operated in a mode selected from, for example, two types of work mode of an economy mode which is an energy-saving mode (work A), and a power mode which is a normal mode (work B). A feature is the proposal for appropriate manipulation gains reflecting the two types of work mode. It is noted that types of work mode may be set arbitrarily.

Figure 17:
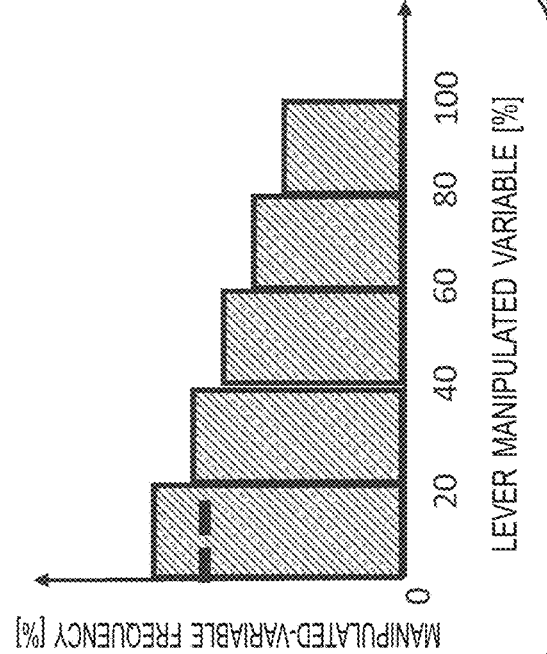
FIG. 17 is a diagram illustrating a display form of a display monitor in the work machine operation assistance device according to the fourth embodiment.

FIG. 17 is a diagram illustrating a display form of the display monitor in the work machine operation assistance device according to the fourth embodiment. A difference of the display form of the display monitor 201 illustrated in FIG. 17 from that in FIG. 10 is a work mode selection section 205 being newly provided. The operator selects either one of work modes of work A and work B. The selected work mode (work mode selection signal 71) is captured by the manipulation gain storage section 80 and the manipulated-variable frequency storage section 82.

Reading-in of Work Mode Setting

Figure 18:
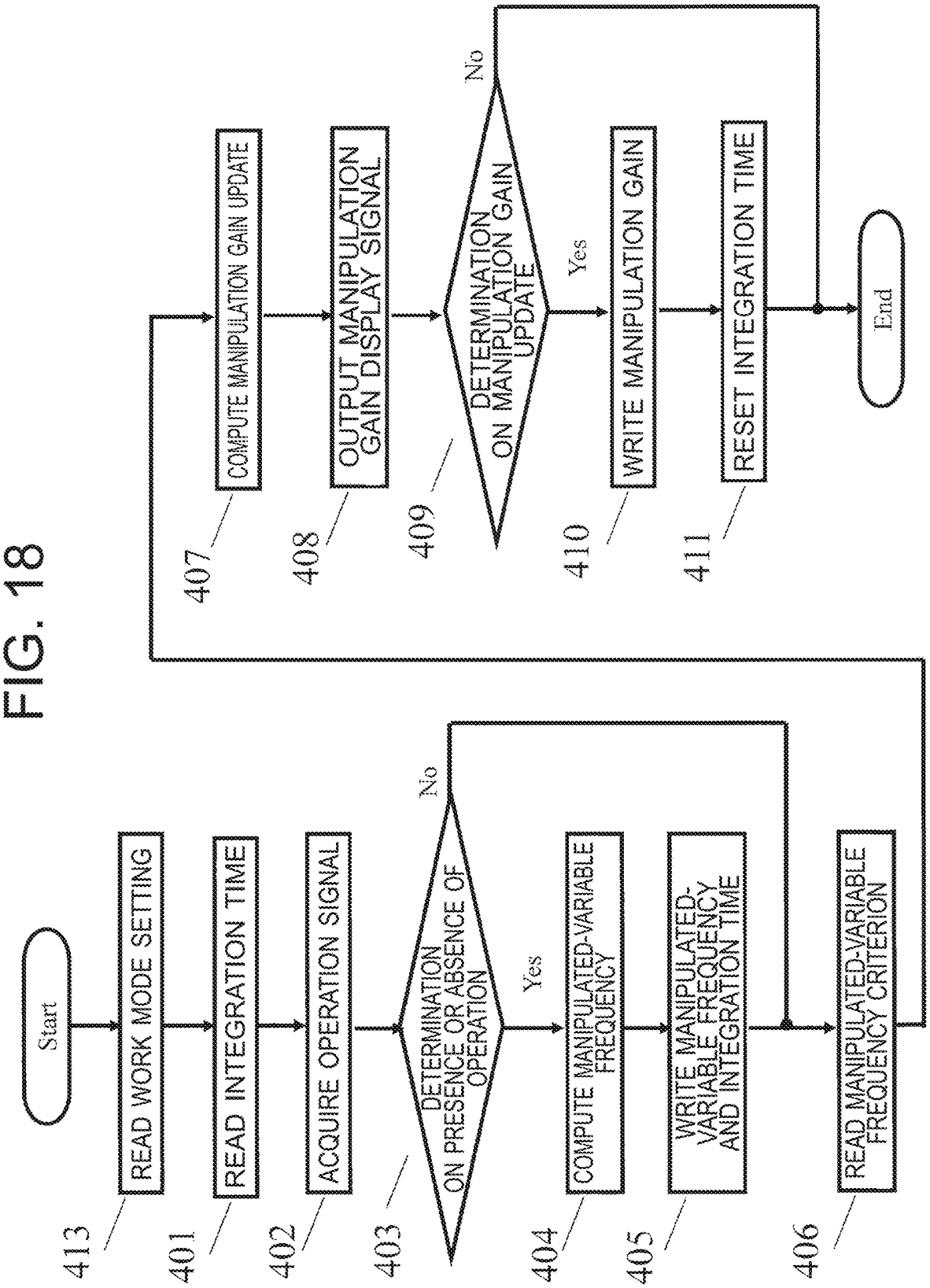
FIG. 18 is a flowchart illustrating the procedure of manipulation gain update processing according to the fourth embodiment.

FIG. 18 is a flowchart illustrating the procedure of manipulation gain update processing according to the fourth embodiment. A difference of the procedure of the manipulation gain update processing illustrated in FIG. 18 from that in FIG. 6 is in that block 413 is added to read the work mode setting. In the fourth embodiment, the manipulation gain storage section 80 and the manipulated-variable frequency storage section 82 have storage areas reserved individually on a work-mode basis. The processing in each of block 401 to block 411 is performed using the manipulation gain and the manipulated-variable frequency which are based on the work mode read in block 413.

According to the fourth embodiment configured as described above, the manipulation gain can be set and updated for each work mode. Accordingly, even if a plurality of operators uses the work machine and/or if the work contents include a variety of items, appropriate manipulation gains can be set to improve the usability.

References to Other Embodiments

The present invention is not limited to the present embodiments described above and various modifications are possible without departing from the scope of the present invention, all technical matters included in the technical idea as described in the appended claims are to be embraced within the scope of the present invention. For example, the present invention may employ the following configurations.

(1) It is possible to choose any number of working fronts and any number of front joins which form the working device, and any type of a working tool, any number of actuators, and the like. Further, regarding the configuration of the operating devices for operating the working device, a configuration of a device using an operating button or the like for operation, other than the lever operation, may be adopted. Further, the arrangement of the operating levers and the operating buttons and the operation method may be selected as appropriate.

(2) Any joint may be an object of manipulation gain update. The setting may be made as necessary, such as, e.g., only when the boom is raised, and/or the like.

Figure 19:
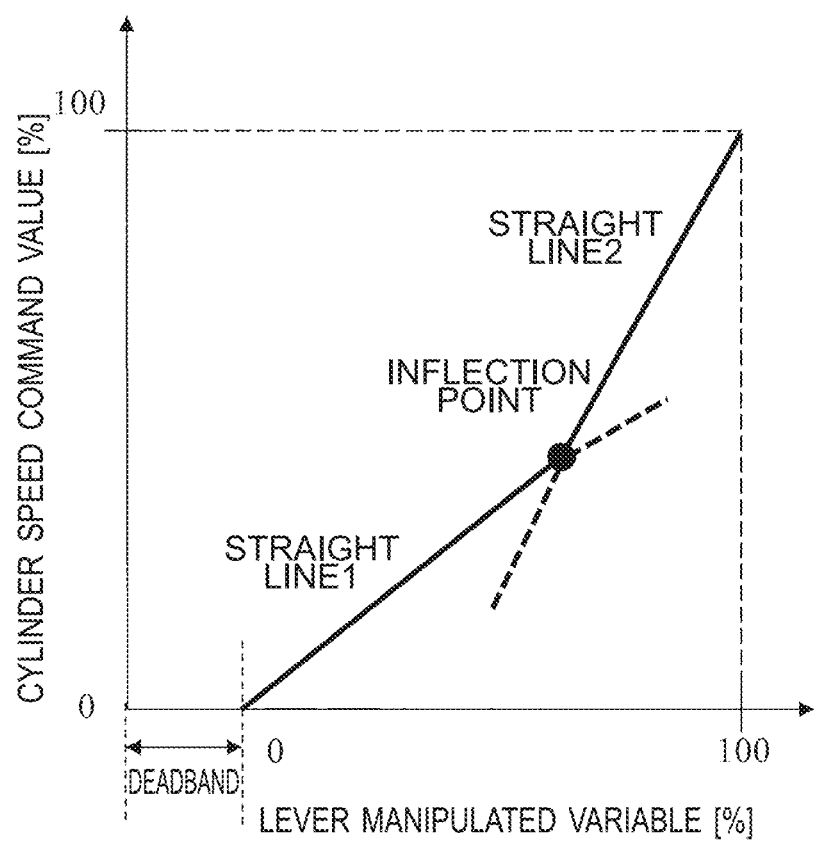
FIG. 19 is a graph illustrating the relationship between the lever manipulated variable and the cylinder speed command value, to which the present invention is applied as another embodiment.

(3) An inflection point is not shown in the manipulation gain map illustrated in FIG. 5, but, for example, as shown in FIG. 19, an inflection point may be set in a manipulation gain map so that the manipulation gain map has straight line 1 from 0% of the manipulated variable to a predetermined value and straight line 2 from the predetermined value to 100%. In such a configuration, even if the work contents is complicated, an appropriate manipulate gain is able to be set to improve the usability.

(4) Other than the configuration in which the manipulated-variable frequency is divided into 20% divisions for storage (FIG. 7), any aspect may be possible, such as, e.g., 10% divisions of the manipulated-variable frequency are stored, and the like.

(5) Other than the configuration in which the manipulated-variable frequency criterion value is set for the 0% to 20% band (FIG. 8), the manipulated-variable frequency criterion value may be set for any band. Further, a plurality of manipulated-variable frequency criterion values may be set. Then, the manipulation gain update computation may be performed on, for example, a band with the largest absolute value of a difference between the manipulated-variable frequency and the manipulated-variable frequency criterion value. The case of using two manipulated-variable frequency criterion values is illustrated in FIG. 2. In this case, because of |B−A|>|B'−A'|, an update computation may be performed using a manipulated-variable frequency criterion value A % (computation using formula (1) described in the first embodiment).

Figure 20:
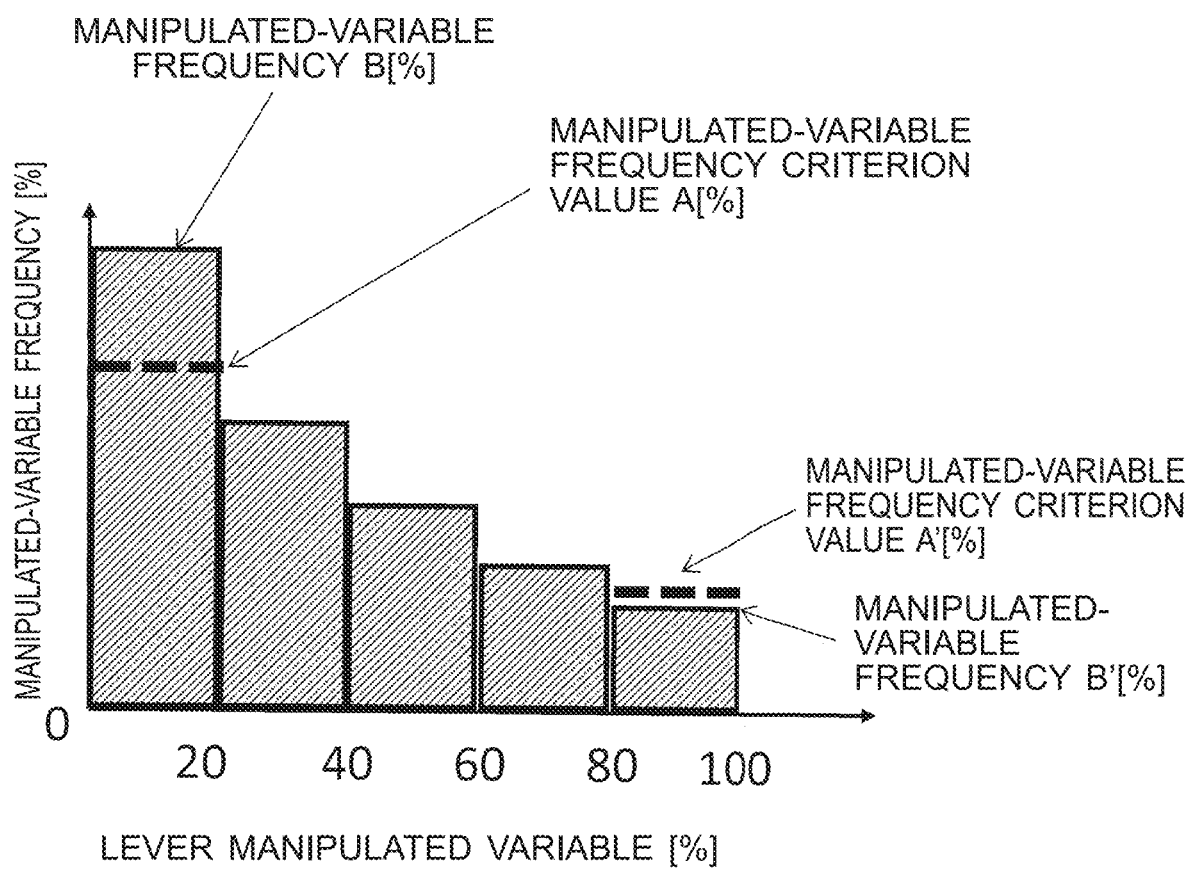
FIG. 20 is a graph illustrating two manipulated-variable frequency criterion values A, A' in regard to the relationship between the lever manipulated variable and the manipulated-variable frequency, to which the present invention is applied as another embodiment.

(6) A combination of a manipulation gain map and a manipulated-variable frequency criterion value is arbitrary. For example, if the manipulation gain map in FIG. 19 and the manipulated-variable frequency criterion value in FIG. 20 are combined, the manipulated-variable frequency criterion value A % may be assigned to a slope update of straight line 1, and the manipulated-variable frequency criterion value B % may be assigned to a slope update of straight line 2.

(7) The arrangements of the display forms of the display monitor 201 in the present embodiments have been presented by way of example only. Any layout, display details and the like may be used arbitrarily. Further, in the configuration in the present embodiments, the manipulated-variable frequency information is displayed as information to make a determination on whether the manipulation gain should be updated or not, but this configuration is not an absolute necessity for carrying out the present invention.

REFERENCE SIGNS LIST

14 . . . Boom (working device)
15 . . . Arm (working device)
16 . . . Boom cylinder (actuator)
17 . . . Arm cylinder (actuator)
18 . . . Working tool cylinder (actuator)
30 . . . Boom operating lever (operating device)
31 . . . Arm operating lever (operating device)
32 . . . Working tool operating lever (operating device)
33 . . . Swing operating lever (operating device)
35 . . . Potentiometer (manipulated variable detection section)
80 . . . Manipulation gain storage section
81 . . . Manipulated-variable frequency arithmetic section
82 . . . Manipulated-variable frequency storage section
83 . . . Manipulated-variable frequency criterion setting section
84 . . . Manipulation gain update arithmetic section
85 . . . Manipulation gain update determination section
86 . . . Criterion range setting section
87 . . . Manipulated-variable frequency determination section
88 . . . Time integration section
100 . . . Work machine
101 . . . Working front (working device)
102 . . . Working tool
200 . . . Controller
201 . . . Display monitor 201 (manipulation gain display section)
204 . . . Manipulation gain update button 204 (manipulation gain update selection section)
205 . . . Work mode selection section

The invention claimed is:

1. A work machine operation assistance device, which is installed in a work machine having a working device driven by an actuator and an operating device to operate the actuator, to assist an operator in operating the operating device, comprising:
a controller configured to generate a drive signal to control the actuator based on a manipulation variable of the operating device detected by a sensor and a manipulation gain indicating a relationship between manipulation of the operating device and a drive speed of the actuator; and
a display monitor coupled to the controller,
wherein the controller is further configured to:
calculate an integration time representing a time period over which the operating device is manipulated,
calculate a manipulated-variable frequency of the operating device on the basis of the detected manipulated variable and the calculated integration time,
compute an updated manipulation gain based on a difference between the calculated manipulated-variable frequency and a predetermined criterion value,
display the updated manipulation gain on the display monitor, and
upon receiving a predetermined user input, overwrite the manipulation gain with the updated manipulation gain.

2. The work machine operation assistance device according to claim 1,
wherein a difference between the manipulation gain and the updated manipulation gain is proportional to a magnitude of the difference between the calculated manipulated-variable frequency and the criterion value.

3. The work machine operation assistance device according to claim 2,
wherein the updated manipulation gain is displayed as either a proportional gain value or a manipulation gain map on the display monitor.

4. The work machine operation assistance device according to claim 2, wherein the controller is further configured to:
 determine whether or not the manipulated-variable frequency falls within a predetermined criterion range, and
 only upon determining that the manipulated-variable frequency falls outside the criterion range, compute the updated manipulation gain.

5. The work machine operation assistance device according to claim 2, wherein the controller is further configured to:
 store a plurality of work modes for different use conditions of the work machine in association with a plurality of different manipulation gains,
 receive a selection of one of the work modes, and
 generate the drive signal to control the actuator based on the detected manipulation variable and the selected manipulation gain, and
 wherein the selected manipulation gain is overwritten with the updated manipulation gain.

6. The work machine operation assistance device according to claim 1,
 wherein the updated manipulation gain is displayed as either a proportional gain value or a manipulation gain map on the display monitor.

7. The work machine operation assistance device according to claim 6, wherein the controller is further configured to:
 determine whether or not the manipulated-variable frequency falls within a predetermined criterion range, and
 only upon determining that the manipulated-variable frequency falls outside the criterion ranqe, compute the updated manipulation gain.

8. The work machine operation assistance device according to claim 6, wherein the controller is further configured to:
 store a plurality of work modes for different use conditions of the work machine in association with a plurality of different manipulation gains,
 receive a selection of one of the work modes, and
 generate the drive signal to control the actuator based on the detected manipulation variable and the selected manipulation gain, and
 wherein the selected manipulation gain is overwritten with the updated manipulation gain.

9. The work machine operation assistance device according to claim 1, wherein the controller is further configured to:
 determine whether or not the manipulated-variable frequency falls within a predetermined criterion range, and
 only upon determining that the manipulated-variable frequency falls outside the criterion range, compute the updated manipulation gain.

10. The work machine operation assistance device according to claim 9, wherein the controller is further configured to:
 store a plurality of work modes for different use conditions of the work machine in association with a plurality of different manipulation gains,
 receive a selection of one of the work modes, and
 generate the drive signal to control the actuator based on the detected manipulation variable and the selected manipulation gain, and
 wherein the selected manipulation gain is overwritten with the updated manipulation gain.

11. The work machine operation assistance device according to claim 1,
 wherein the controller is further configured to:
 store a plurality of work modes for different use conditions of the work machine in association with a plurality of different manipulation gains,
 receive a selection of one of the work modes,
 generate the drive signal to control the actuator based on the detected manipulation variable and the selected manipulation gain, and
 wherein the selected manipulation gain is overwritten with the updated manipulation gain.

12. A work machine comprising:
 a working device;
 an actuator which drives the working device;
 an operating device configured to be manipulated by an operator of the work machine;
 a sensor configured to detect a manipulation variable of the operating device;
 a controller configured to generate a drive signal to control the actuator based on the detected manipulation variable and a manipulation gain indicating a relationship between manipulation of the operating device and a drive speed of the actuator; and
 a display monitor coupled to the controller,
 wherein the controller is further configured to:
 calculate an integration time representing a time period over which the operating device is manipulated,
 calculate a manipulated-variable frequency of the operating device on the basis of the detected manipulated variable and the calculated integration time,
 compute an updated manipulation gain based on a difference between the calculated manipulated-variable frequency and a predetermined criterion value,
 display the updated manipulation gain on the display monitor, and
 upon receiving a predetermined user input, overwrite the manipulation gain with the updated manipulation gain.

* * * * *